(12) United States Patent
Bala et al.

(10) Patent No.: US 11,303,493 B2
(45) Date of Patent: Apr. 12, 2022

(54) TRANSMIT DIVERSITY FOR UPLINK CONTROL CHANNEL USING DISCRETE FOURIER TRANSFORM SPREAD ORTHOGONAL FREQUENCY DIVISION MULTIPLEXING (DFT-S-OFDM) WAVEFORMS

(71) Applicant: IDAC HOLDINGS, INC., Wilmington, DE (US)

(72) Inventors: Erdem Bala, East Meadow, NY (US); Moon-il Lee, Melville, NY (US); Shahrokh Nayeb Nazar, San Diego, CA (US); Afshin Haghighat, Ile-Bizard (CA); Alphan Sahin, Westbury, NY (US); Rui Yang, Greenlawn, NY (US); Frank La Sita, Setauket, NY (US)

(73) Assignee: IDAC HOLDINGS, INC., Wilmington, DE (US)

( * ) Notice: Subject to any disclaimer, the term of this patent is extended or adjusted under 35 U.S.C. 154(b) by 37 days.

(21) Appl. No.: 16/496,246

(22) PCT Filed: Mar. 22, 2018

(86) PCT No.: PCT/US2018/023831
§ 371 (c)(1),
(2) Date: Sep. 20, 2019

(87) PCT Pub. No.: WO2018/175766
PCT Pub. Date: Sep. 27, 2018

(65) Prior Publication Data
US 2020/0145271 A1    May 7, 2020

Related U.S. Application Data

(60) Provisional application No. 62/474,996, filed on Mar. 22, 2017.

(51) Int. Cl.
H04B 7/06 (2006.01)
H04L 1/06 (2006.01)
(Continued)

(52) U.S. Cl.
CPC ....... *H04L 27/2636* (2013.01); *H04B 7/0404* (2013.01); *H04B 7/0456* (2013.01);
(Continued)

(58) Field of Classification Search
CPC ......... H04W 72/0446; H04W 72/0413; H04W 72/042; H04L 5/0055; H04L 5/0023; H04L 1/1819
See application file for complete search history.

(56) References Cited

U.S. PATENT DOCUMENTS 8,774,224 B2   7/2014 Lee et al.
8,995,386 B2 *  3/2015 Goto ................. H04W 72/0453
                                                    370/330
(Continued)

FOREIGN PATENT DOCUMENTS

CN    101764636 A   6/2010
EP    2 525 543    11/2012
WO    2010/015127   2/2010

OTHER PUBLICATIONS

"A novel transmit diversity scheme for LTE-Advance," *available at* http://wk.baidu.com.cn/view/dfebfa1db7360b4c2e3f6425?pn=2&pu=rc@1,pic@on,sl@1,pw@500,sz@240_320,pd@1,fz@2,lp@887,tpl@color,#2 (Jun. 2011)[1].
(Continued)

*Primary Examiner* — Iqbal Zaidi
(74) *Attorney, Agent, or Firm* — Volpe Koenig

(57) ABSTRACT

Methods and apparatuses are described herein for transmit diversity in an uplink control channel. A wireless transmit/receive unit (WTRU) may perform a Discrete Fourier Trans-
(Continued)

form (DFT) precoding operation on a data symbol sequence segment to generate a DFT precoded segment. The WTRU may then perform a Space Frequency Block Coding (SFBC) operation on the DFT precoded segment to generate a SFBC processed segment. The data symbols of the DFT precoded segment may be reordered in the SFBC processed segment. The WTRU may map the DFT precoded segment to a first set of contiguous subcarriers and the SFBC processed segment to a second set of contiguous subcarriers. The WTRU may then transmit a first DFT spread Orthogonal Frequency Division Multiplexing (DFT-s-OFDM) signal on the first set of contiguous subcarriers via a first antenna port and a second DFT-s-OFDM signal on the second set of contiguous subcarriers via a second antenna port.

17 Claims, 22 Drawing Sheets

(51) Int. Cl.
  *H04L 5/00* (2006.01)
  *H04L 27/26* (2006.01)
  *H04B 7/0404* (2017.01)
  *H04B 7/0456* (2017.01)

(52) U.S. Cl.
  CPC .......... *H04B 7/068* (2013.01); *H04L 1/0606* (2013.01); *H04L 1/0643* (2013.01); *H04L 5/0023* (2013.01); *H04L 27/2607* (2013.01)

(56) References Cited

U.S. PATENT DOCUMENTS

| | | |
|---|---|---|
| 2007/0189151 A1 | 8/2007 | Pan et al. |
| 2011/0129029 A1 | 6/2011 | Liu et al. |
| 2012/0039158 A1 | 2/2012 | Cheng et al. |
| 2012/0307760 A1 | 12/2012 | Han et al. |
| 2013/0136071 A1 | 5/2013 | Han et al. |
| 2014/0204842 A1 | 7/2014 | Kim et al. |
| 2014/0274087 A1* | 9/2014 | Frenne .................. H04L 5/0037 455/452.1 |
| 2015/0055596 A1 | 2/2015 | Yokomakura et al. |
| 2020/0119850 A1* | 4/2020 | Gao ...................... H04L 1/0643 |

OTHER PUBLICATIONS

Interdigital Communications, "On transmit diversity for Short PUCCH," 3GPP TSG RAN WG1 Meeting #88 bis, R1-1705521, Spokane, USA (Apr. 3-7, 2017).

Interdigital Inc., "On the Performance of Uplink Transmit Diversity Schemes," 3GPP TSG RAN WG1 Meeting #90, R1-1714136, Prague, Czech Republic (Aug. 21-25, 2017).

Interdigital Inc., "On transmit diversity for Long PUCCH," 3GPP TSG RAN WG1 Meeting #90, R1-1714155, Prague, Czech Republic (Aug. 21-25, 2017).

Interdigital Inc., "On transmit diversity for Long PUCCH," 3GPP TSG RAN WG1 Meeting #89, R1-1708351, Hangzhou, P.R. China (May 15-19, 2017).

Interdigital Inc., "STBC-based Transmission for Uplink Transmit Diversity," 3GPP TSG RAN WG1 NR Ad-Hoc#2, R1-1710921, Qingdao, P.R. China (Jun. 27-30, 2017).

Mitsubishi Electric, "Uplink transmit diversity schemes for LTE Advanced," 3GPP TSG RAN WG1 #53bis meeting, R1-082522, Warsaw, Poland (Jun. 30-Jul. 4, 2008).

Huawei et al., "Transmit diversity for PUCCH," 3GPP TSG RAN WG1 Meeting #88, R1-1701651, Athens, Greece (Feb. 13-17, 2017).

* cited by examiner

TRANSMIT DIVERSITY FOR UPLINK CONTROL CHANNEL USING DISCRETE FOURIER TRANSFORM SPREAD ORTHOGONAL FREQUENCY DIVISION MULTIPLEXING (DFT-S-OFDM) WAVEFORMS

CROSS REFERENCE TO RELATED APPLICATION

This application is the U.S. National Stage, under 35 U.S.C. § 371, of International Application No. PCT/US2018/023831 filed Mar. 22, 2018, which claims the benefit of U.S. Provisional Application No. 62/474,996, filed on Mar. 22, 2017, the contents of which are hereby incorporated by reference herein.

BACKGROUND

In fifth generation New Radio (5G NR), an uplink control channel may carry various uplink control signals such as hybrid automatic repeat request (HARQ) acknowledgements (ACK/NACK), channel state information (CSI) reports, and scheduling requests (SRs). In order to transmit the uplink control signals, the NR uplink (UL) control channel may deploy two types of transmissions: short duration and long duration. In short duration UL control channel transmissions, control signals may be transmitted near or adjacent to the last transmitted UL orthogonal frequency division multiplexing (OFDM) symbol(s) of a slot. In long duration UL control channel transmissions, control signals may be transmitted over multiple UL OFDM symbols. For the long duration UL control channel transmission, 5G NR has adopted discrete fourier transform spread orthogonal frequency division multiplexing (DFT-s-OFDM) as the waveform in addition to OFDM. However, the coverage and reliability of DFT-s-OFDM waveforms may be degraded due to the intersymbol interference in high delay spread channels or the channel variance between separated subcarriers. Thus, it would be desirable to have transmit diversity schemes that work with any number of DFT-s-OFDM symbols while improving the coverage and reliability of DFT-s-OFDM waveforms.

SUMMARY

Methods and apparatuses are described herein for transmit diversity in an uplink control channel. For example, a wireless transmit/receive unit (WTRU) perform a Discrete Fourier Transform (DFT) precoding operation on a data symbol sequence segment to generate a DFT precoded segment. The data symbol sequence segment may include uplink control information. The WTRU may then perform a Space Frequency Block Coding (SFBC) operation on the DFT precoded segment to generate a SFBC processed segment. The SFBC operation may include at least one of a circular rotation operation, a conjugation operation, or a negation operation on the DFT precoded segment. Upon generating the DFT precoded segment and the SFBC processed segment, the WTRU may map the DFT precoded segment and the SFBC processed segment to a first set of contiguous subcarriers and a second set of contiguous subcarriers, respectively. The WTRU may then transmit a first Discrete Fourier Transform spread Orthogonal Frequency Division Multiplexing (DFT-s-OFDM) signal on the first set of contiguous subcarriers via a first antenna port and a second DFT-s-OFDM signal on the second set of contiguous subcarriers via a second antenna port.

The data symbols of the DFT precoded segment may be reordered in the SFBC processed segment. The data symbol sequence segment may also be divided into one or more data symbol sequence segments. The WTRU may determine the number of the data symbol sequence segment based on at least one of a channel delay spread, a modulation order, or a bandwidth allocation.

BRIEF DESCRIPTION OF THE DRAWINGS

A more detailed understanding may be had from the following description, given by way of example in conjunction with the accompanying drawings wherein.

DETAILED DESCRIPTION

Figure 1A:
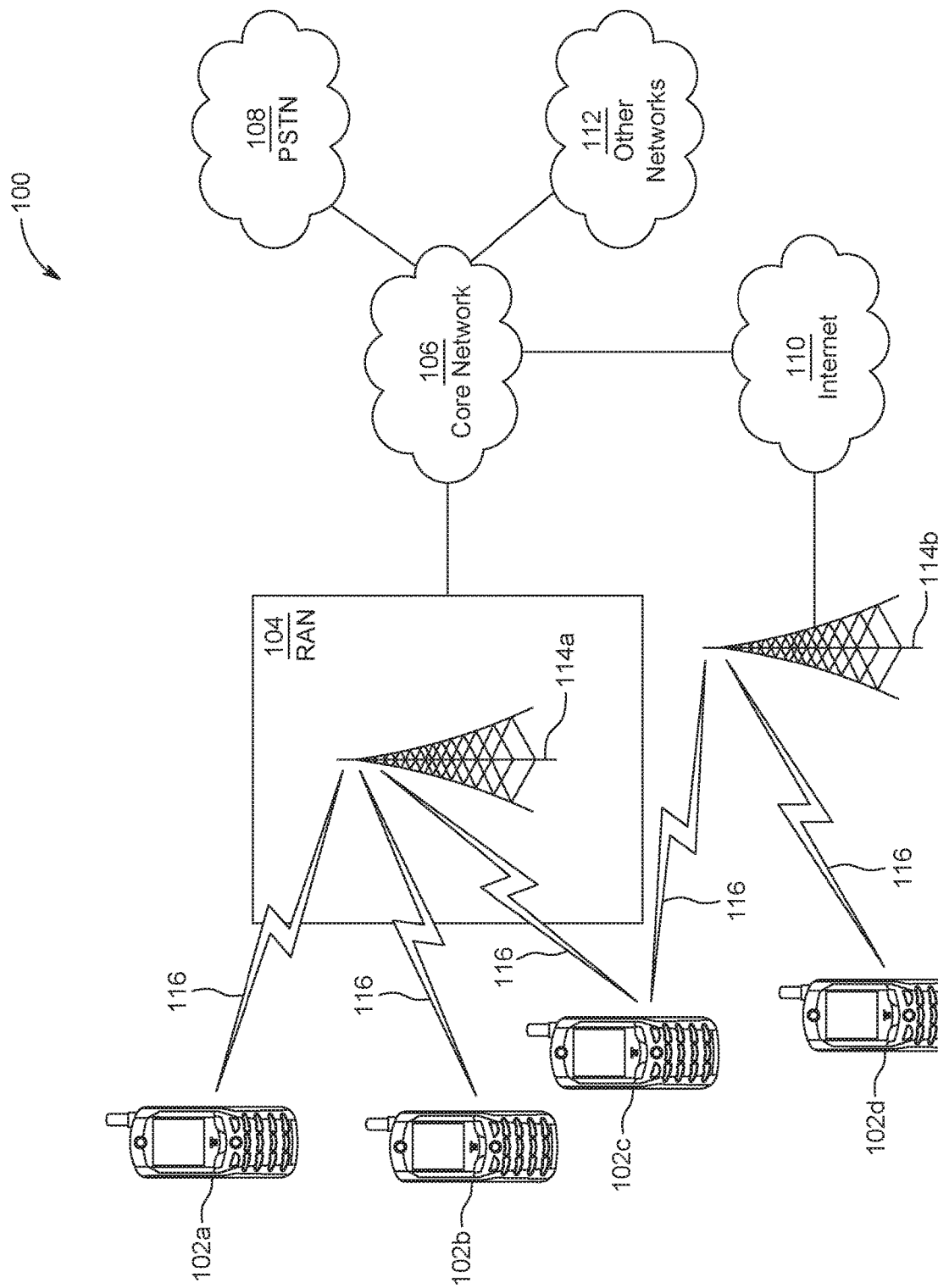
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
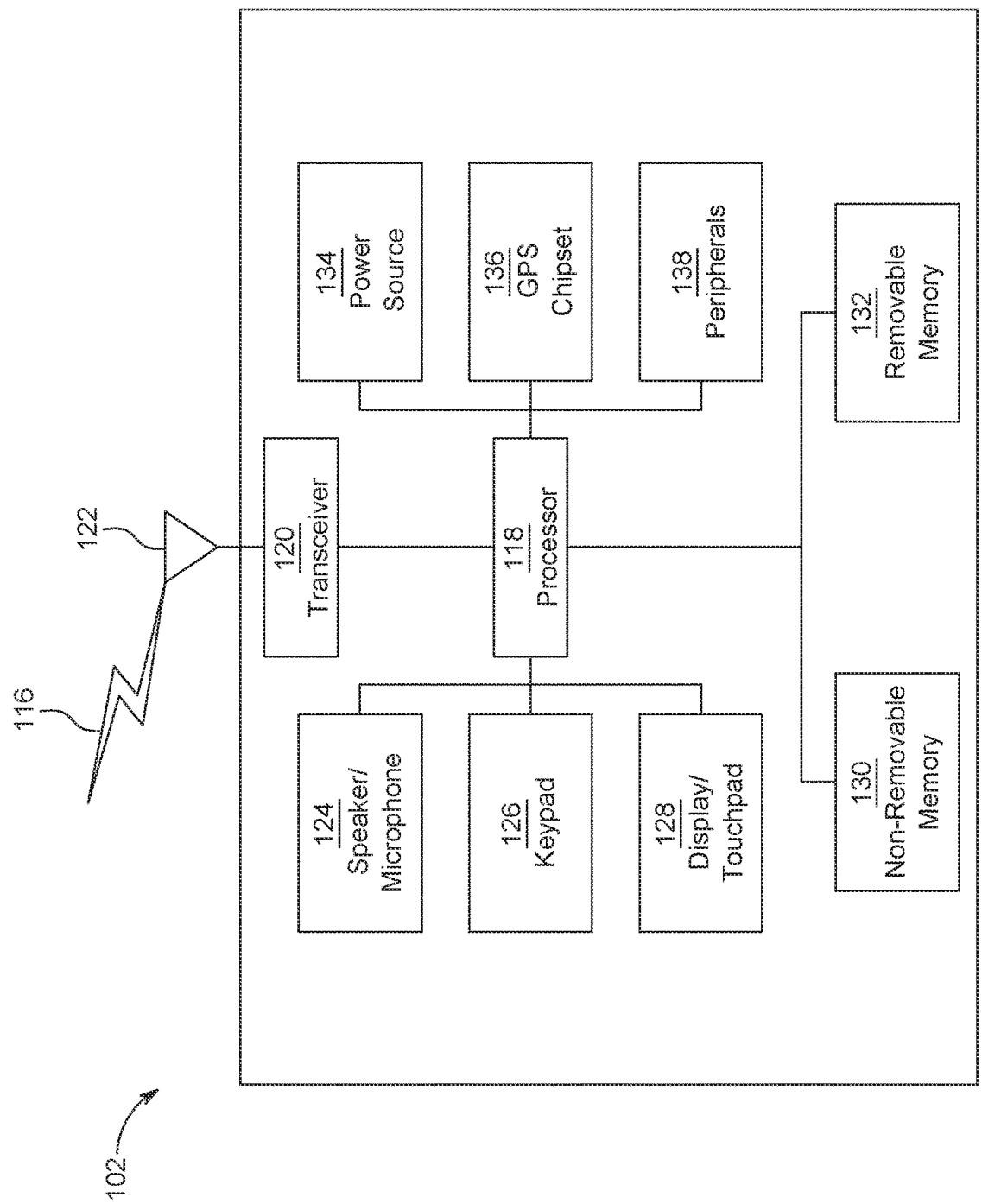
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
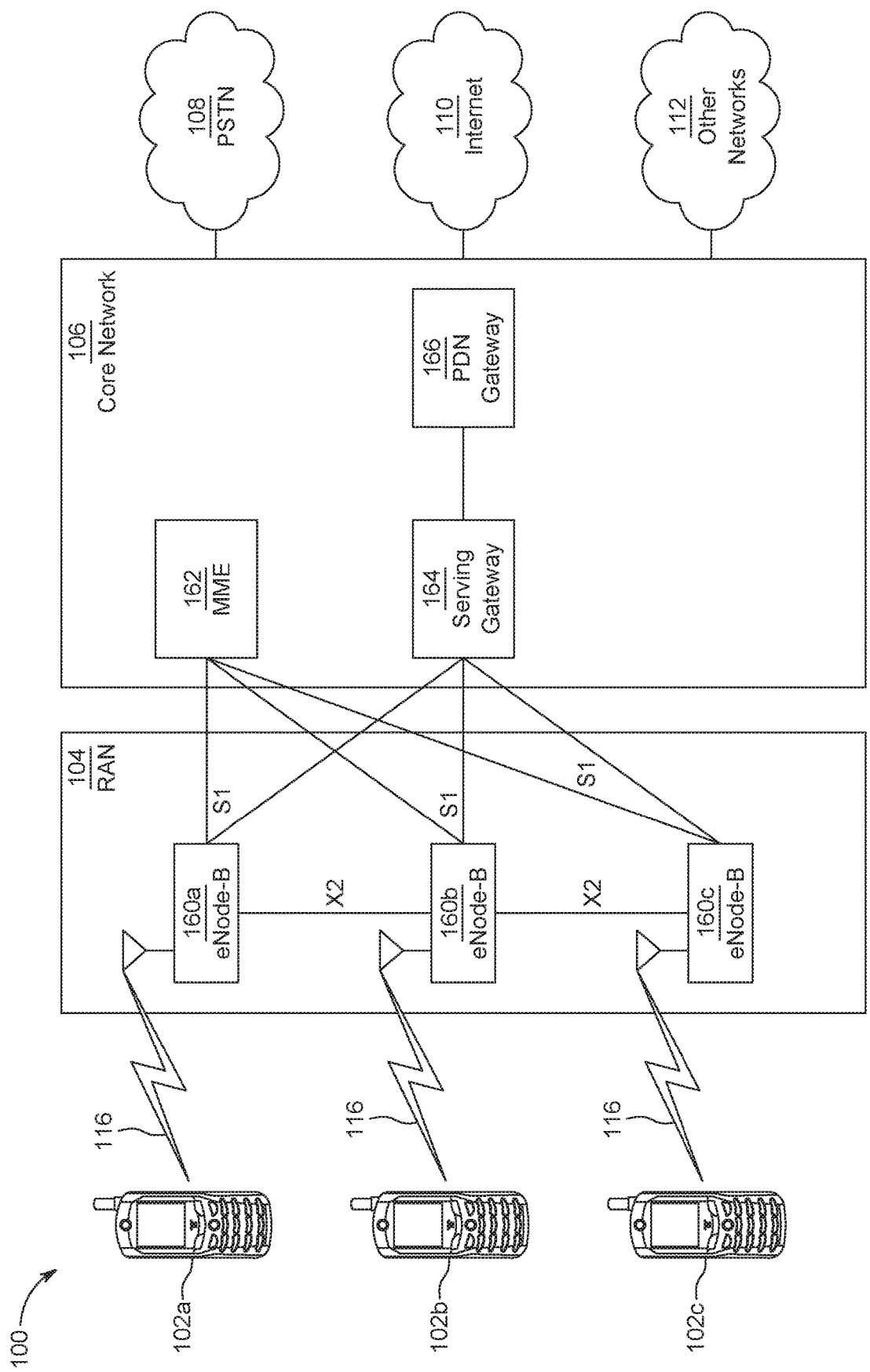
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Figure 10:
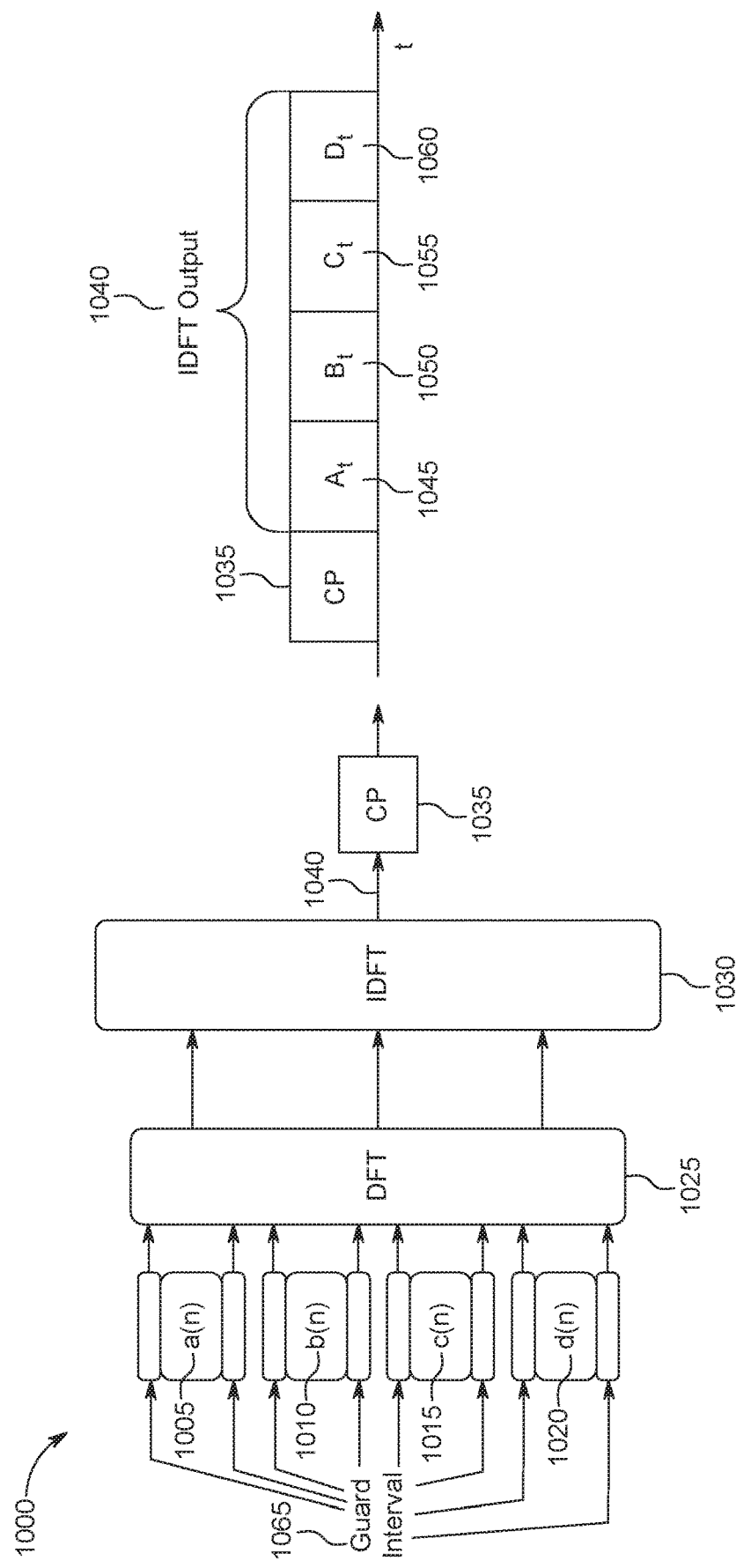
FIG. 10 is a diagram illustrating another example STBC processing for a single DFT-s-OFDM symbol with four sub-symbols.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
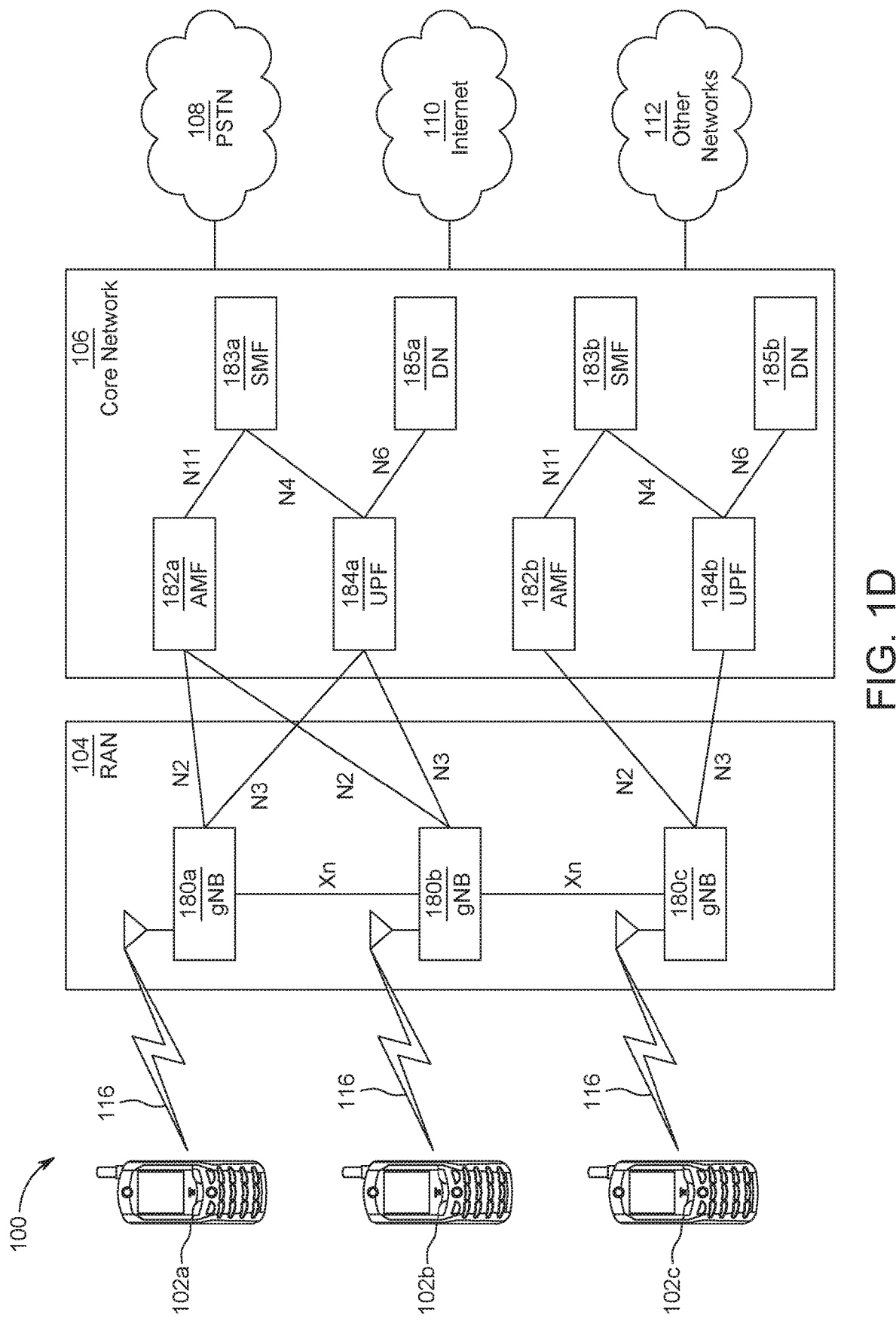
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
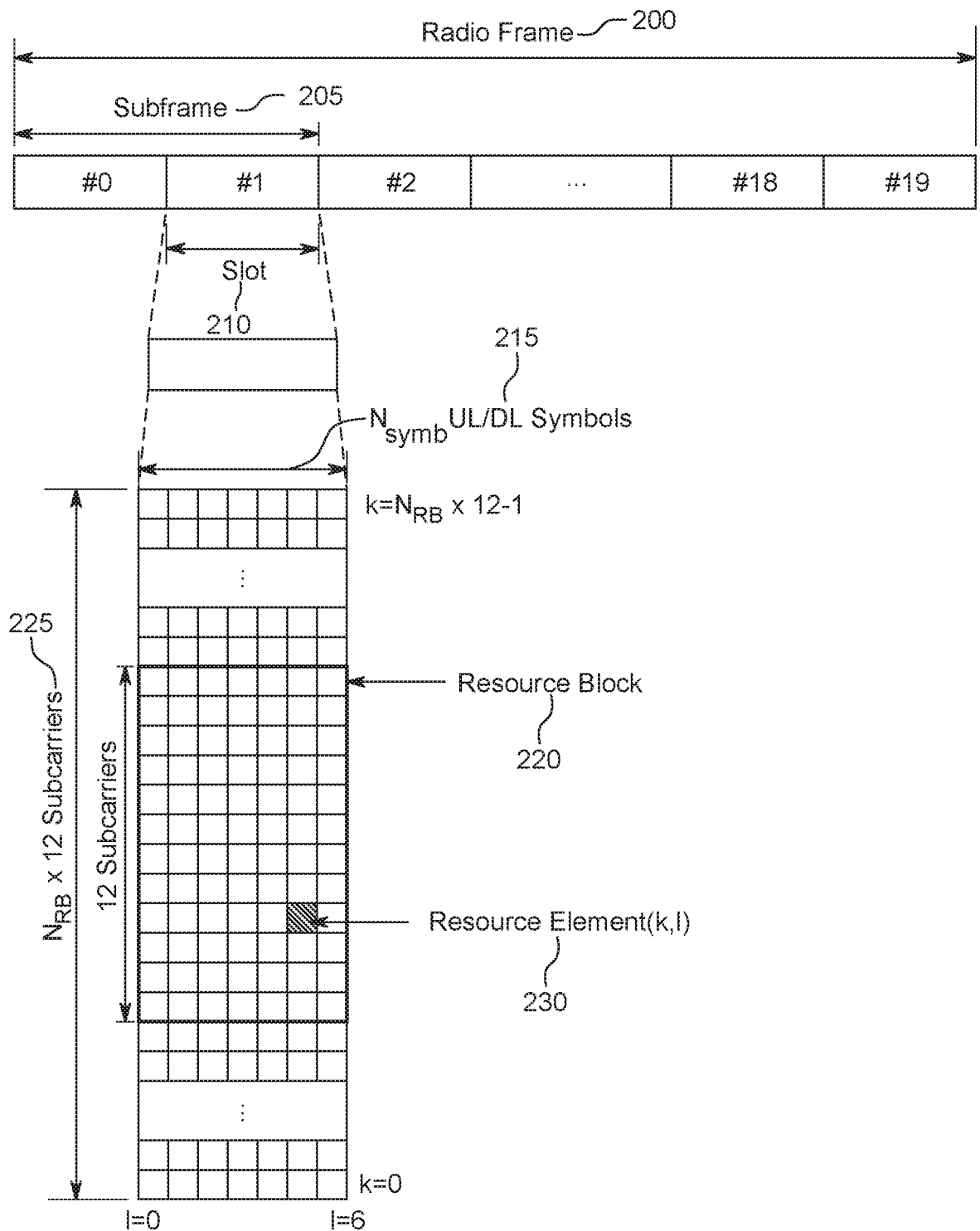
FIG. 2 is a diagram illustrating an example structure of a radio frame that may be used within the communications system illustrated in FIG. 1A.

FIG. 2 is a diagram illustrating an example structure of a radio frame 200 which may be used in combination with any of other embodiments described herein. As illustrated in FIG. 2, a radio frame 200 may include ten (10) subframes 205, and one subframe 205 may include two slots 210. The slots 210 in the radio frame 200 may be numbered by #0 to #19. A time taken for the transmission of one subframe 205 may be called a transmission time interval (TTI). The TTI may be a scheduling unit for a data transmission. For example, a radio frame 200 may have a length of 10 ms, a subframe 205 may have a length of 1 ms, and a slot may have a length of 0.5 ms. One slot 210 may have multiple Uplink (UL)/Downlink (DL) symbols 215. For example, for the downlink, the slot 210 may include multiple OFDM symbols 215 in a time domain and multiple subcarriers in a frequency domain. Similarly, for the uplink, the slot 210 may include multiple SC-FDMA symbols 215 in a time domain and multiple subcarriers in a frequency domain. As shown in FIG. 2, a slot 210 may include $N_{symb} \times UL/DL$ symbols 215 in a time domain and $N_{RB} \times 12$ subcarriers 225 in a frequency domain.

A resource block (RB) 220 may be a resource allocation unit and include multiple contiguous subcarriers in a slot. For example, a resource block 220 includes seven (7) OFDM symbols in a time domain and twelve (12) subcarriers in a frequency domain. A resource element 230 is the smallest unit of resource. The resource element 230 may include one subcarrier for duration of one symbol. Thus, an RB 220 may include 84 REs 230 in the case of the normal cyclic prefix length, and 72 REs 230 in the case of the extended cyclic prefix. Within certain RBs 220, some REs 230 may be reserved for special purpose: for example, synchronization signals, reference signals (RSs), control signaling and broadcast system information. The remaining REs 230 may be used for data transmission, and may be allocated in pairs of RBs 220 (e.g., the paring being in the time domain).

Figure 3:
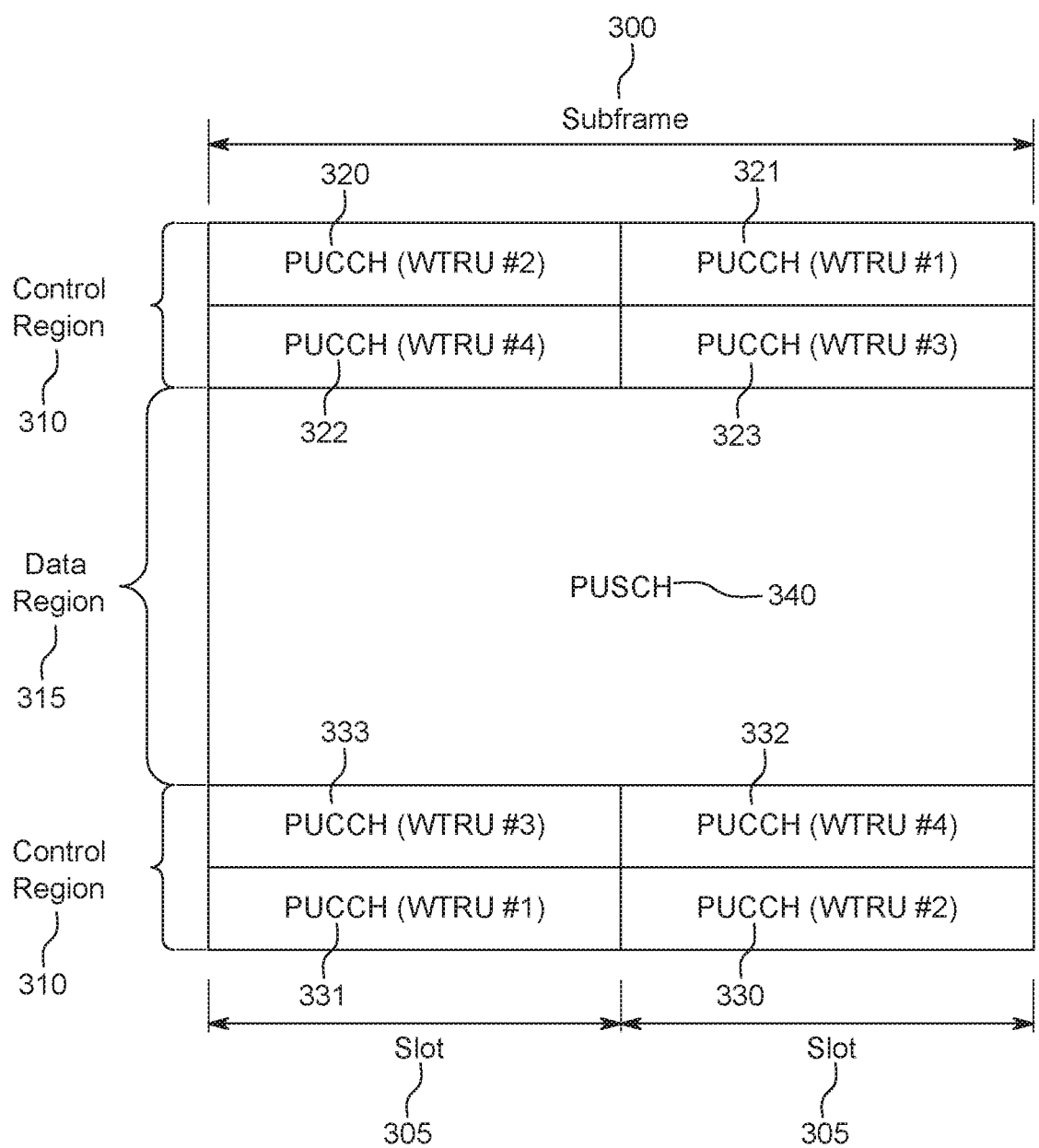
FIG. 3 is a diagram illustrating an example structure of an uplink (UL) subframe that may be used within the radio frame illustrated in FIG. 2.

FIG. 3 illustrates an example structure of an uplink (UL) subframe 300 which may be used in combination with any of other embodiments described herein. As illustrated in FIG. 3, an UL subframe 300 may include two slots 305, and each of the slots 305 may include multiple UL symbols (e.g., multiple SC-FDMA symbols). The UL subframe 300 may be divided into control regions 310 and a data region 315 in the frequency domain. The control regions 310 may allocate physical uplink control channels (PUCCHs) 320, 321, 322, 323, 330, 331, 332, 333 for transmitting uplink control information. The data region 315 may allocate a physical uplink shared channel (PUSCH) 340 for transmitting data. If indicated by a higher layer, a WTRU may support simultaneous transmission of the PUCCH 320, 321, 322, 323, 330, 331, 332, 333 and the PUSCH 340.

As illustrated in FIG. 3, the PUCCH 320, 321, 322, 323, 330, 331, 332, 333 may be allocated in an RB pair for a WTRU. For example, a PUCCH 320 for a WTRU #2 may be paired with a PUCCH 330 for the WTRU #2. Similarly, a PUCCH 321 for a WTRU #1 may be paired with a PUCCH 331 for the WTRU #1. RBs belonging to the same RB pair may occupy different subcarriers in each of the slots 305. A frequency occupied by the RBs belonging to the RB pair allocated to the PUCCH may change at a slot boundary. This may be called that the RB pair allocated to the PUCCH 320, 321, 322, 323, 330, 331, 332, 333 is frequency-hopped at a slot boundary. Since the WTRU transmits UL control information over time through different subcarriers, a frequency diversity gain can be obtained.

The PUCCH 320, 321, 322, 323, 330, 331, 332, 333 may carry various types of control information according to its format. For example, a PUCCH format 1 may carry a scheduling request (SR). A PUCCH format 1a may carry an acknowledgement/non-acknowledgement (ACK/NACK) modulated by using bit phase shift keying (BPSK) with respect to one codeword. A PUCCH format 1b may carry an ACK/NACK modulated by using quadrature phase shift keying (QPSK) with respect to two codewords. A PUCCH format 2 may carry a channel quality indicator (CQI) modulated by using QPSK. PUCCH formats 2a and 2b may carry CQI and ACK/NACK.

Figure 4:
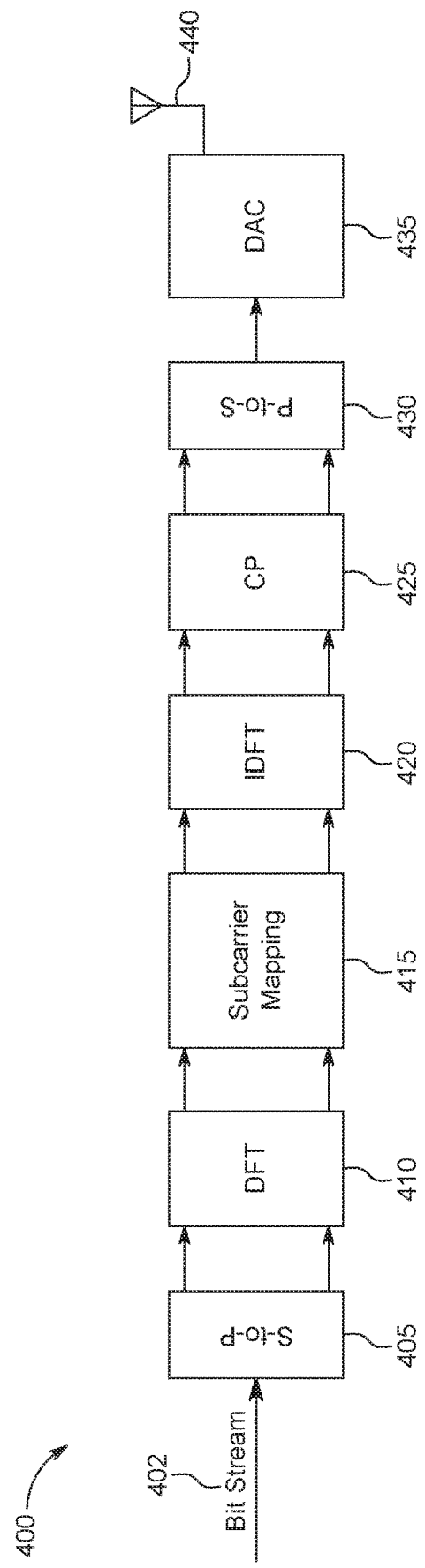
FIG. 4 is a diagram illustrating an example single carrier-frequency division multiple access (SC-FDMA) transmitter that may be used within the WTRU illustrated in FIG. 1B.

FIG. 4 illustrates an example single carrier-frequency division multiple access (SC-FDMA) transmitter 400, which may be used in combination with any of other embodiments described herein. As illustrated in FIG. 4, the SC-FDMA transmitter 400 may comprise a serial-to-parallel converter 405, a Discrete Fourier Transform (DFT) processor 410, a subcarrier mapper 415, an inverse DFT (IDFT) processor 420, a cyclic prefix (CP) adder 425, a parallel-to-serial converter 430, a digital-to-analog converter 435, and a transmitter 440.

A bit stream 402 may first be modulated to a data symbol sequence based on a modulation scheme such as Binary Phase Shift Keying (BPSK), Quadrature Phase Shift Keying (QPSK), n-ary Quadrature Amplitude Modulation (n-QAM) or the like. The S-to-P converter 405 may then convert the serial data symbol sequence to N parallel data symbol sequences. The N parallel data symbol sequences may be fed through a size-N DFT processor 410, where N corresponds to the number of subcarriers assigned for the transmission. The subcarrier mapper 206 maps N data symbols to N subcarriers allocated from among a total of M subcarriers and pads the remaining (M-N) subcarriers with 0s. The size-M IDFT processor 420 may convert the data symbols mapped to a frequency area to a time-domain sequence by M-point IDFT. The CP adder 425 may then generate an SC-FDMA (or DFS-s-OFDMA) symbol by adding a cyclic prefix (CP) to the time-domain sequence to reduce inter-symbol interference and inter-carrier interference. The parallel-to-serial converter 430 may serialize the SC-FDMA (or DFS-s-OFDMA) symbol. The DAC 435 may convert the serial SC-FDMA (or DFS-s-OFDMA) symbol to an analog signal, and the converted analog signal may be transmitted via the transmitter 440.

As described above, uplink layer 1/layer 2 control signaling may be transmitted in a physical uplink control channel (PUCCH). This information may include a channel quality indicator (CQI), multiple-input multiple-output (MIMO) feedback, a scheduling request (SR), a hybrid automatic repeat request (HARQ) acknowledgement/negative acknowledgement (ACK/NACK), or the like. The PUCCH may be allocated on resource blocks (RBs) at the edge of the channel bandwidth (BW) to avoid fragmenting RBs available to a physical uplink shared channel (PUSCH) and may span the entire slot. The narrow bandwidth of the PUCCH in each slot (e.g., in a single RB) may maximize the power per subcarrier for a given total transmission power. As described above, various PUCCH formats can be based on the link performance and multiplexing capacity of a range of uplink control payloads. For example, format 1/1a/1b may be designed to carry 1 to 2 bits of control information, while format 2/2a/2b is capable of conveying 20-22 coded bits.

When simultaneous uplink PUSCH data and control signaling is scheduled for a WTRU, the control signaling may be multiplexed together with the data prior to Discrete Fourier Transform (DFT) spreading (or DFT precoding), in order to preserve the single-carrier low-Cubic Metric (CM) property of the uplink transmission. As such, the uplink control channel PUCCH may be used by a WTRU to transmit any necessary control signaling in one or more subframes in which the WTRU has not been allocated any RBs for PUSCH transmission.

Physical uplink control signaling for 5G New Radio (NR) may carry at least hybrid-ARQ acknowledgements, Channel State Information (CSI) reports (possibly including beamforming information), scheduling requests (SR), or the like. Moreover, support may be provided for two types of transmissions for NR uplink (UL) control channel: short duration and long duration. For short duration UL control channel transmissions, control signaling may be transmitted near or adjacent to the last transmitted UL OFDM symbol(s) of a slot. For long duration UL control channel transmissions, UL control signaling may be transmitted over multiple UL symbols to improve coverage. Both time division multiplexing and/or frequency division multiplexing with UL data channel within a slot may be used for short duration UL control channel transmissions (i.e., 'short PUCCH'). However, frequency division multiplexing with UL data channel within a slot may be used for long duration UL control channel transmissions (i.e., 'long PUCCH').

In NR, a short duration control channel transmission may be 1 or 2 symbols long and may be multiplexed in the time, frequency or code domains. Support for both orthogonal frequency division multiplexing (OFDM) and DFT-spread OFDM (DFT-S-OFDM) based waveforms may be provided for uplink transmission. DFT-S-OFDM-based waveforms (such as DFT-S-OFDM, unique word DFT-S-OFDM (UW-DFT-S-OFDM), zero-tail DFT-S-OFDM (ZT-DFT-S-OFDM) or the like) used in transmissions from cell-edge or power limited WTRUs. NR may also allow the numerology (e.g., the subcarrier spacing) of the symbols to change from symbol to symbol.

As described above, DFT-s-OFDM may be used as the waveform of 5G NR. The DFT-s-OFDM may have the advantage of achieving a low Peak to Average Power Ratio (PAPR)/Cubic Metric (CM) for the "long PUCCH". The DFT-s-OFDM may also be used for the "short PUCCH". Transmit diversity schemes may be used to improve the coverage and reliability of the PUCCH. Thus, it is desirable to have the transmit diversity schemes that preserve a low PAPR of the DFT-s-OFDM waveform while it is able to function with any number of DFT-s-OFDM symbols.

Several techniques may be used to achieve transmit diversity with DFT-s-OFDM transmission. Such techniques may be used with two or more transmit antenna ports. Although various embodiments described herein are based on two antenna ports, the embodiments described herein are not limited to the two antenna ports, but may include two or more transmit antenna ports. In addition, such techniques may be used with other single carrier waveforms. The single carrier wave forms may include, but are not limited to, Zero Tail DFT-s-OFDM, Unique Word DFT-s-OFDM, Guard Interval DFT-s-OFDM, and Flexible DFT-s-OFDM. As used herein, the term "OFDM symbol" may be used interchangeably with "DFT-s-OFDM symbol".

Figure 5:
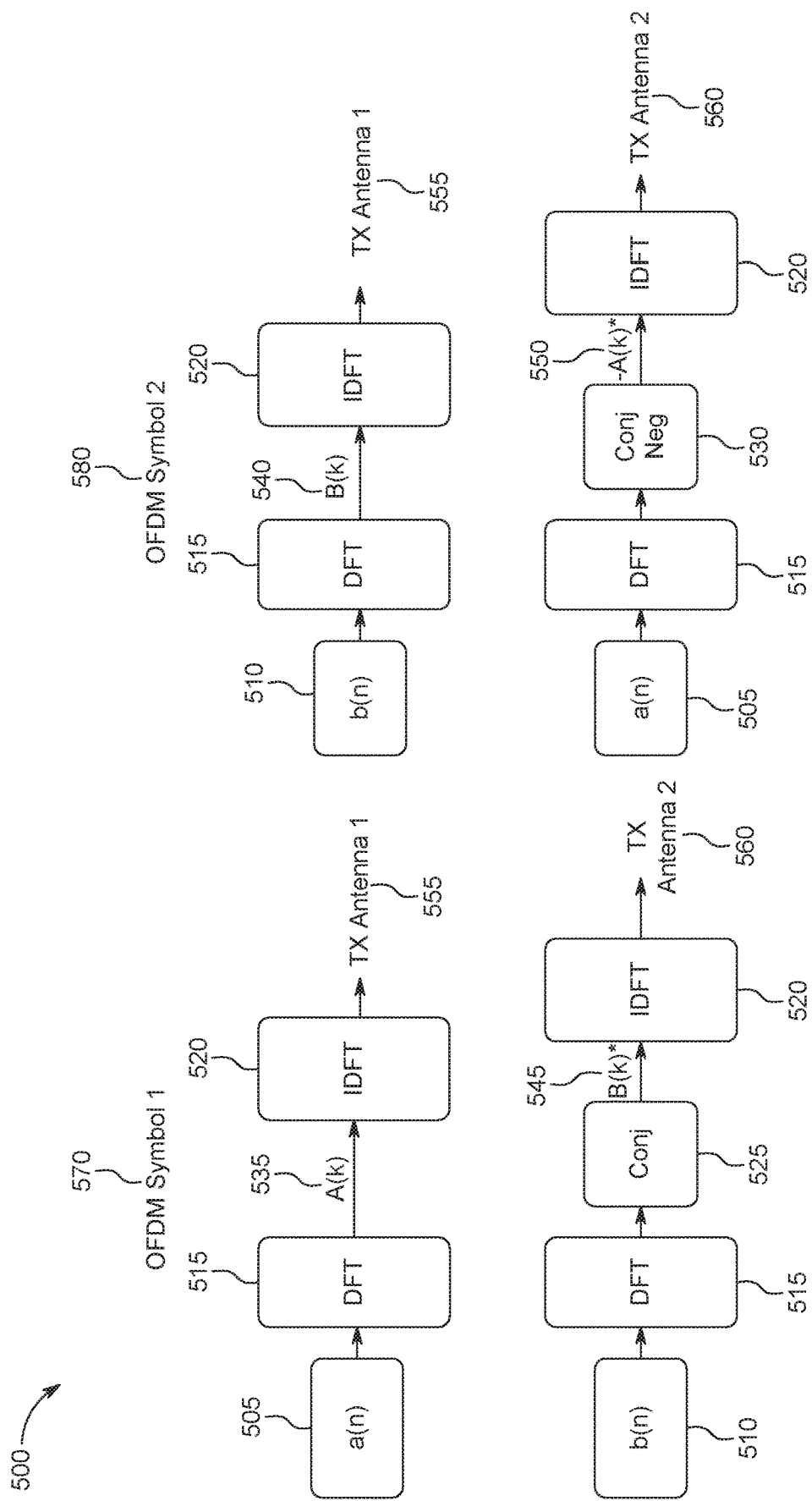
FIG. 5 is a diagram illustrating an Alamouti transmit diversity scheme.

FIG. 5 illustrates an Alamouti transmit diversity scheme 500 for two antenna ports 555, 560, which may be used in combination with any of other embodiments described herein. Transmit diversity may be achieved by performing space time coding before or after the DFT spreading (or DFT precoding). For example, conjugation and/or negation operations may be performed after the DFT spreading (i.e. in the frequency domain) as illustrated in FIG. 5. Similar effect may be obtained by performing the conjugation and/or negation operations before the DFT spreading (i.e. in the time domain). This approach can be referred to as space time block diversity coding (STBC) for DFT-s-OFDM. As used herein, the Alamouti transmit diversity 500 may refer to STBC or Alamouti coding. As illustrated in FIG. 5, two data sequences, a(n) 505 and b(n) 510, may be processed by a DFT block 515, resulting in A(k) 535 and B(k) 540, respectively, where n is the sample index and k is the subcarrier index. Before the B(k) 540 is processed at the IDFT block 520, a conjugation operation 525 may be applied to the B(k) 540 of the first OFDM symbol 570 to generate B(k)* 545, which is to be transmitted from the second antenna port, TX Antenna 2 560. Similarly, before the A(k) 535 is processed at the IDFT block (520), conjugation and/or negation operations may be applied to the A(k) 535 of the second OFDM symbol 580 to generate −A(k)* 550, which is to be transmitted from the second antenna port, TX Antenna 2 560. Assuming that the channel from the first antenna port (i.e. TX Antenna 1 555) to the receiver antenna port $H_1$ (not shown in FIG. 5) and the channel from the second antenna port (i.e. TX Antenna 2 560) to the receiver antenna port $H_2$ (not shown in FIG. 5) do not change significantly over the duration of two OFDM symbols 570, 580 (and therefore can be assumed to be the same):

$$R_1(k)=H_1(k)A(k)+H_2(k)B^*(k)$$

$$R_2(k)=H_1(k)B(k)-H_2(k)A^*(k)$$

Here, $R_1(k)$ is the received signal on the k'th subcarrier of the first OFDM symbol 570 and $R_2(k)$ is the received signal on the same subcarrier of the second OFDM symbol 580. Alamouti combining may be performed as $$\begin{bmatrix} H_1^* & -H_2(k) \\ H_2^* & H_1(k) \end{bmatrix} \begin{bmatrix} R_1(k) \\ R_2^*(k) \end{bmatrix} = \begin{bmatrix} |H_1(k)|^2 + |H_2(k)|^2 & 0 \\ 0 & |H_1(k)|^2 + |H_2(k)|^2 \end{bmatrix} \begin{bmatrix} A(k) \\ B^*(k) \end{bmatrix}$$

where the superscript * denotes a conjugation operation.

The embodiment described in FIG. 5 may require two OFDM symbols 570, 580 to perform STBC coding. In another embodiment, it may be possible to perform STBC on a single DFT-s-OFDM symbol. This may be achieved by decomposing a DFT-s-OFDM symbol into several sub-symbols and performing STBC over the several sub-symbols of the same DFT-s-OFDM symbol.

Figure 6:
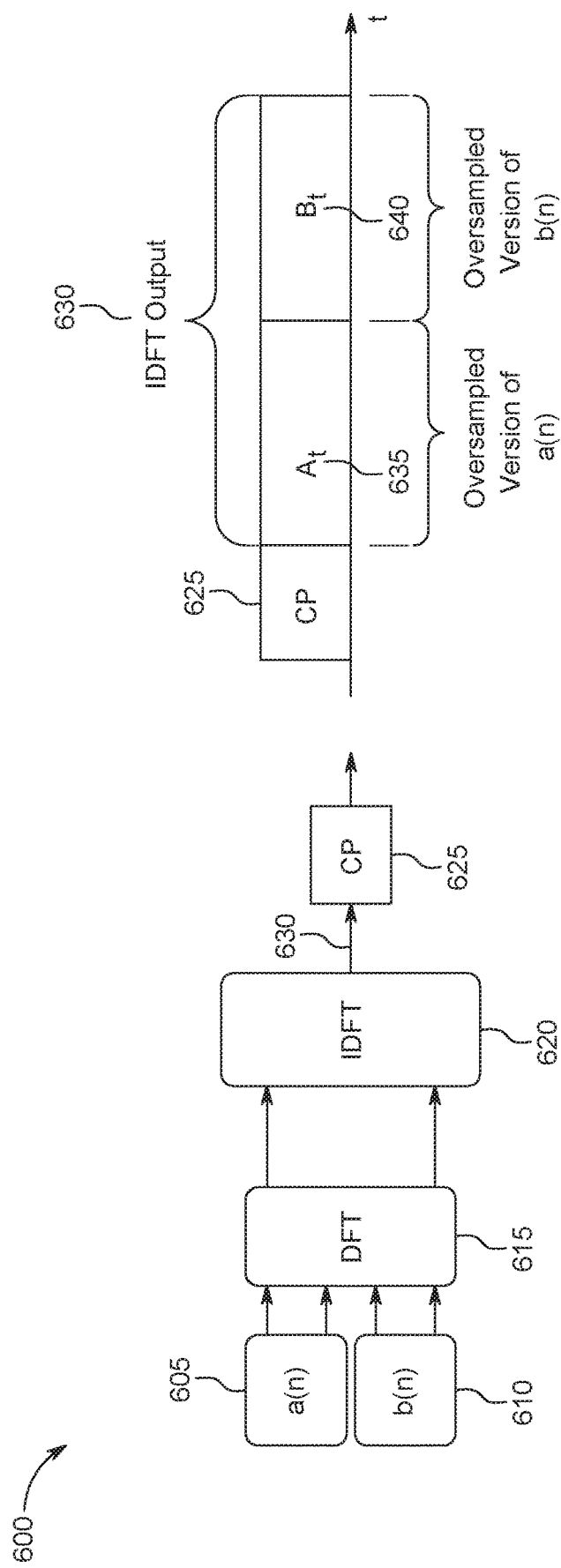
FIG. 6 is a diagram illustrating an example processing of the sub-symbols of a Discrete Fourier Transform spread Orthogonal Frequency Division Multiplexing (DFT-s-OFDM) symbol.

FIG. 6 illustrates an example processing 600 of the sub-symbols of a Discrete Fourier Transform spread Orthogonal Frequency Division Multiplexing (DFT-s-OFDM) symbol. As illustrated in FIG. 6, if two data sequences a(n) 605 and b(n) 610 are input to a DFT block 615, the signal at the output 630 of the Inverse DFT (IDFT) block 620 may comprise two sub-symbols, $A_t$ 635 and $B_t$ 640, where $A_t$ 635 and $B_t$ 640 may be considered as the oversampled versions of a(n) 605 and b(n) 610. If the DFT size is M and the IDFT size is N, then the oversampling ratio may be given as N over M (i.e. N/M).

STBC may thus be performed over the sub-symbols a(n) 605 and b(n) 610. Due to the multipath delay channel, intersymbol interference may occur between $A_t$ 635 and $B_t$ 640. Furthermore, cyclic convolution may not be preserved per sub-symbol. Therefore, to enable the sub-symbols to be processed separately, internal cyclic prefixes (CP) 625 may be introduced (or added) to the data sequences a(n) 605 and b(n) 610.

Figure 7:
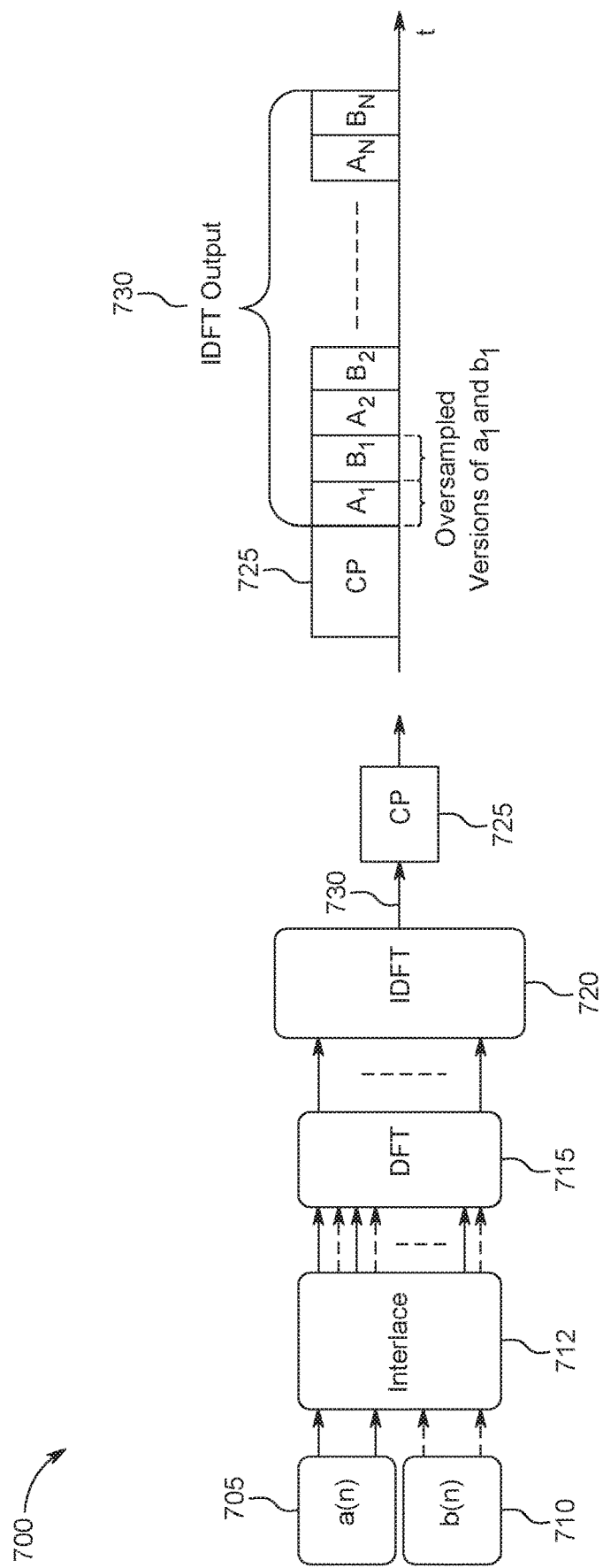
FIG. 7 is a diagram illustrating another example processing of the sub-symbols of a DFT-s-OFDM symbol.

FIG. 7 illustrates another example processing 700 of the sub-symbols of a DFT-s-OFDM symbol. In a STBC system, it may be desirable for the channel to remain relatively static during the transmission of adjacent STBC paired symbols. FIG. 7 shows example block mapping of the input data symbol vectors a and b.

For example, prior to a DFT block 715, the vectors a 705 and b 710 may be segmented to groups of smaller sub-blocks, and interlaced at a interlace block 712 to create a sequential stream of smaller data packets suited for STBC coding. The interlaced output can be sent to the DFT block 715 and the input data blocks can be interleaved prior to being sent to the IDFT block 720. Assuming that a M point DFT is used, and as an exemplary case of one symbol per sub-block, the input vectors a and b to the DFT block 715 can be represented as $[a_0\ b_0\ a_1\ b_1\ \ldots\ a_{M/2-1}\ b_{M/2-1}]$. Similar to FIG. 6, internal cyclic prefixes (CP) 725 may be added to the IDFT output 730 in order to enable the sub-symbols to be processed separately.

Figure 8:
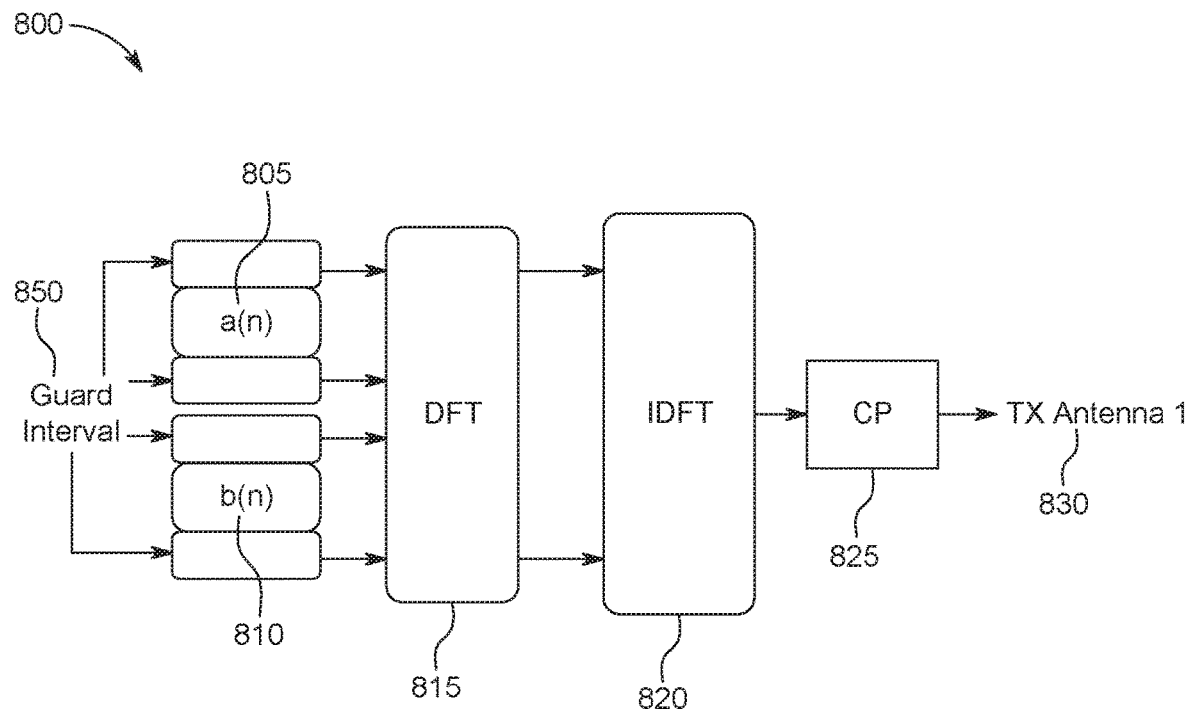
FIG. 8 is a diagram illustrating an example STBC processing for a single DFT-s-OFDM symbol.
Figure 8:
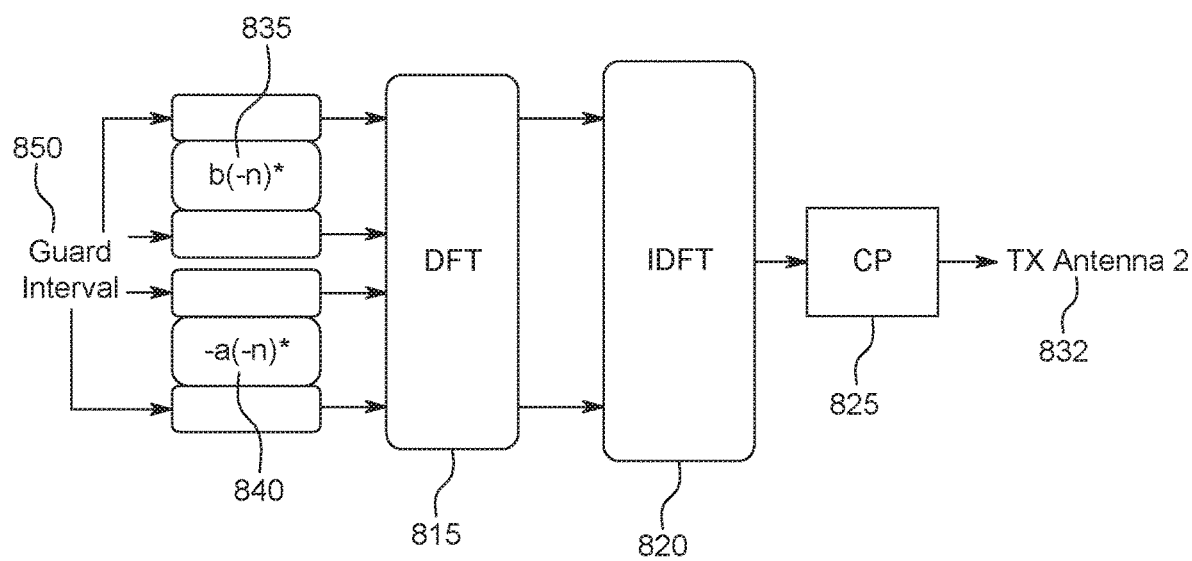

FIG. 8 illustrates an example STBC processing 800 for a single DFT-s-OFDM symbol. In an embodiment, a single DFT-s-OFDM symbol may be separated (or decomposed) into two sub-symbols (or blocks) based on the time domain. Each of the two sub-symbols (or blocks) may be treated as one DFT-s-OFDM symbol for the STBC operation. For example, data sequences a(n) 805 and b(n) 810 may be divided from a single DFT-s-OFDM symbol and each of the data sequences a(n) 805 and b(n) 810 may be treated as sub-symbols decomposed form a single DFT-s-OFDM symbols. The STBC operation may then be performed onto a(n) 85 and b(n) 810, thereby generating b(−n)* 835 and −a(−n)* 840. a(n) 805 and b(n) 810 may be interfered with each other because of the channel delay spread. Thus, in order to tackle the delay spread, a guard interval 850 may be added on the ends of a(n) 805, b(n) 810, b(−n)* 835 and −a(−n)* 840 as illustrated in FIG. 8 as an example. The use of guard interval 850 may be flexible and configurable. For example, the duration of the guard interval 850 may be pre-determined or may be set according to channel delay spread characteristics. The location of guard interval 850 may also be variable. For example, the guard interval 850 may be added before the start of the data sequences and/or after the end of data sequences. The guard interval 850 may be positioned anywhere in the data sequences. The guard interval 850 may carry any information or data such as zeros, fixed values, sequences, or the like. For example, a sequence that can be used for time/frequency synchronization may be used for the guard interval 850. As used herein, the term guard interval may be used interchangeably with a cyclic prefix (CP), internal CP, internal guard interval, or the like.

The guard interval 850 (or internal CP) may be generated in several ways. For example, the last K samples of the data sequence may be copied to the front of the data sequence. In an example, the data sequence a(n) 805 may be defined as $a(n)=[a_{M-K+1}\ \ldots\ a_M\ a_0\ a_1\ \ldots\ a_{M-K+1}\ a_M]$. In another example, the last K and first K samples of the data sequence may be set to a fixed sequence, for example, $a(n)=[x_1\ \ldots\ x_K\ a_0\ a_1\ \ldots\ a_{M-K}\ x_1\ \ldots\ x_K]$, or $a(n)=[x_1\ \ldots\ x_K\ a_0\ a_1\ \ldots\ a_{M-K}\ x_K\ \ldots\ x_1]$. In yet another example, the last K and first K samples of the data sequence may be set to zero.

It should be noted that the data sequence (i.e. a(n) 805, b(n) 810, b(−n)* 835 and −a(−n)* 840) with guard intervals 850 may be processed by a single DFT block 815 or multiple DFT blocks. The output of the DFT block (s) 815 may also be processed by a single IDFT block 820 or multiple IDFT blocks.

As illustrated in FIG. 8, the STBC processing 800 may be performed for the two transmit antenna ports, TX Antenna 1 830 and TX Antenna 2 832. For example, [a(n) b(n)] 805, 810 may be transmitted from the first antenna port (i.e. TX Antenna 1 830), while [b(−n)* −a(−n)*] 835, 840 may be transmitted from the second antenna port (i.e. TX Antenna 2 832). Internal CPs 825 may be added to each of the sub-sequences a(n) 805, b(n) 810, b(−n)* 835 and −a(−n)* 840 before transmitted.

When two transmit antenna ports TX Antenna 1 830 and TX Antenna 2 832 are used, the receiver (not shown in FIG. 8) may work as follows: assuming that the two halves of the received symbol are denoted by (n=0, 1, ..., N−1):

$$r_1(n)=h_1(n)\otimes A_t(n)+h_2(n)\otimes B_t^*(-n)$$

$$r_2(n)=h_1(n)\otimes B_t(n)-h_2(n)\otimes A_t^*(-n)$$

Here, $\otimes$ denotes a circular convolution operator that is made possible due to the guard intervals (or internal CPs). After passing each one sub-symbol through a DFT block in the receiver:

$$R_1(k)=H_1(k)A(k)+H_2(k)B^*(k)$$

$$R_2(k)=H_1(k)B(k)-H_2(k)A^*(k)$$

Multiplying the sub-symbols $R_1(k)$ and $R_2(k)$ with $H^*_1(k)$ and $H^*_2(k)$:

$$R_1(k)H_1^*(k)=H_1(k)A(k)H_1^*(k)+H_2(k)B^*(k)H_1^*(k)$$

$$R_1(k)H_2^*=H_1(k)A(k)H_2^*(k)+H_2(k)B^*(k)H_2^*(k)$$

$$R_2(k)H_1^*(k)=H_1(k)B(k)H_1^*(k)-H_2(k)A^*(k)H_1^*(k)$$

$$R_2(k)H_2^*(k)=H_1(k)B(k)H_2^*(k)-H_2(k)A^*(k)H_2^*(k)$$

Alamouti combining can be achieved by:

$$R_1(k)H_1^*(k)+(R_2(k)H_2^*(k))^*=|H_1(k)|^2+|H_2(k)|^2 A(k)$$

$$R_1(k)H_2^*(k)+(R_2(k)H_1^*(k))^*=|H_1(k)|^2+|H_2(k)|^2 B(k)$$

Figure 9:
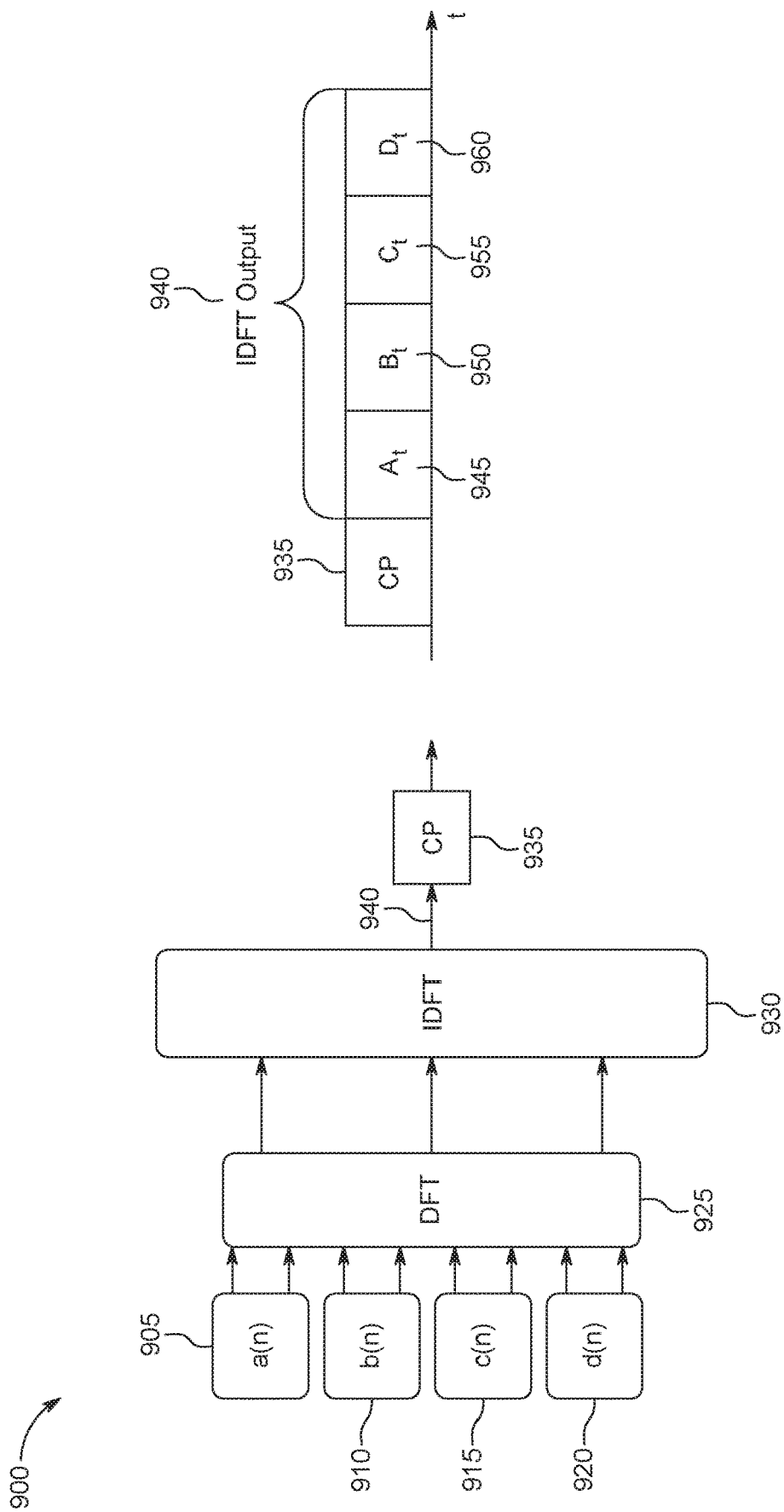
FIG. 9 is a diagram illustrating an example STBC processing for a single DFT-s-OFDM symbol with four sub-symbols.

The above STBC processing using two sub-symbols may be extended to multiple sub-symbols as illustrated in FIG. 9 and FIG. 10. FIG. 9 illustrates an example STBC processing 900 for a single DFT-s-OFDM symbol with four sub-symbols. As illustrated in FIG. 9, each of the four data sequences a(n) 905, b(n) 910, c(n) 915, and d(n) 920 may be treated as four sub-symbols decomposed from a single DFT-s-OFDM symbol and may not include guard intervals (or internal CPs). If four data sequences a(n) 905, b(n) 910, c(n) 915, and d(n) 920 are input to a DFT block 925, the signal at the output 940 of the Inverse DFT (IDFT) block 930 may comprise four sub-symbols $A_t$ 945, $B_t$ 950, $C_t$ 955, and $D_t$ 960 where $A_t$ 945, $B_t$ 950, $C_t$ 955, and $D_t$ 960 may be considered as the oversampled versions of a(n) 905, b(n) 910, c(n) 915, and d(n) 920, respectively. If the DFT size is M and the IDFT size is N, then the oversampling ratio may be given as N over M (i.e. N/M). The STBC operation may be performed over the sub-symbols a(n) 905, b(n) 910, c(n) 915, and d(n) 920. Due to the multipath delay channel, intersymbol interference may occur between $A_t$ 945, $B_t$ 950, $C_t$ 955, and $D_t$ 960. Furthermore, cyclic convolution may not be preserved per sub-symbol. Therefore, to enable the sub-symbols to be processed separately, internal cyclic prefixes (CP) 935 may be introduced (or added) to the IDFT output 940.

FIG. 10 illustrates another example STBC processing 1000 for a single DFT-s-OFDM symbol with four sub-symbols. Similar to FIG. 9, each of the four data sequences a(n) 1005, b(n) 1010, c(n) 1015, and d(n) 1020 may be treated as four sub-symbols decomposed from a single DFT-s-OFDM symbol. However, a(n) 1005, b(n) 1010, c(n) 1015, and d(n) 1020 may be interfered with each other because of the channel delay spread. Thus, guard intervals 1065 may be added on a(n) 1005, b(n) 1010, c(n) 1015, and d(n) 1020 as illustrated in FIG. 10. If four data sequences a(n) 1005, b(n) 1010, c(n) 1015, and d(n) 1020 are input to a DFT block 1025, the signal at the output 1040 of the Inverse DFT (IDFT) block 1030 may comprise four sub-symbols $A_t$ 1045, $B_t$ 1050, $C_t$ 1055, and $D_t$ 1060 where $A_t$ 1045, $B_t$ 1050, $C_t$ 1055, and $D_t$ 1060 may be considered as the oversampled versions of a(n) 1005, b(n) 1010, c(n) 1015, and d(n) 1020. The STBC operation may be performed over the sub-symbols a(n) 1005, b(n) 1010, c(n) 1015, and d(n) 1020, and to enable the sub-symbols to be processed separately, internal cyclic prefixes (CP) 1035 may be introduced (or added) to the IDFT output 1040.

In general, the input to a DFT block may include K sub-sequences and the STBC operation may be performed over the K sub-sequences. In an example where K=4, the sequences to be transmitted may be written as X(n) where each row m denotes the sequence to be from antenna port m:

$$X(n) = \begin{bmatrix} a(n) & b(n) & c(n) & d(n) \\ -b^*(n) & a^*(n) & -d^*(n) & c^*(n) \\ a(n) & b(n) & -c(n) & -d(n) \\ -b^*(n) & a^*(n) & d^*(n) & -c^*(n) \end{bmatrix}$$

Figure 11:
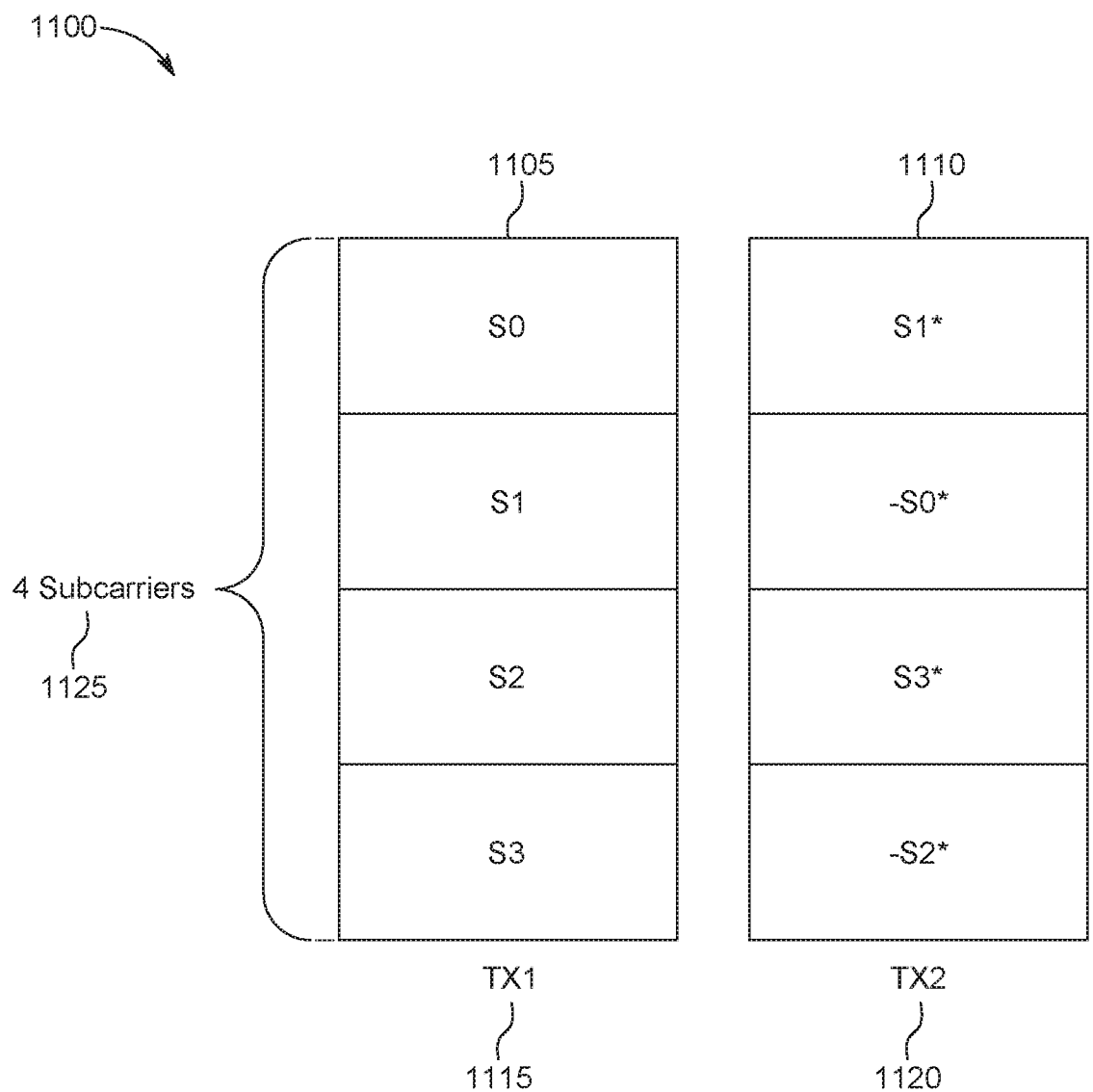
FIG. 11 is a diagram illustrating an example SFBC re-ordering.

Space frequency block coding (SFBC) may also be used to achieve transmit diversity. To apply SFBC, the output of a DFT block may be re-ordered before being mapped to subcarriers. FIG. 11 illustrates an example SFBC re-ordering 1100 which may be used in combination with any of other embodiments described herein. As illustrated in FIG. 11, symbols 1105, 1110 may be transmitted over four subcarriers 1125 using two antenna ports, TX1 1115 and TX2 1120, where the symbols 1105, 1110 are at the output of the DFT block. Since the symbols 1110 to be transmitted from the second antenna port (i.e. TX2 1120) have been re-ordered, the peak-to-average power ratio (PAPR) of the signal transmitted from the second antenna port (i.e. TX2 1120) may be higher than the PAPR of the signal transmitted from the first antenna port.

Figure 12:
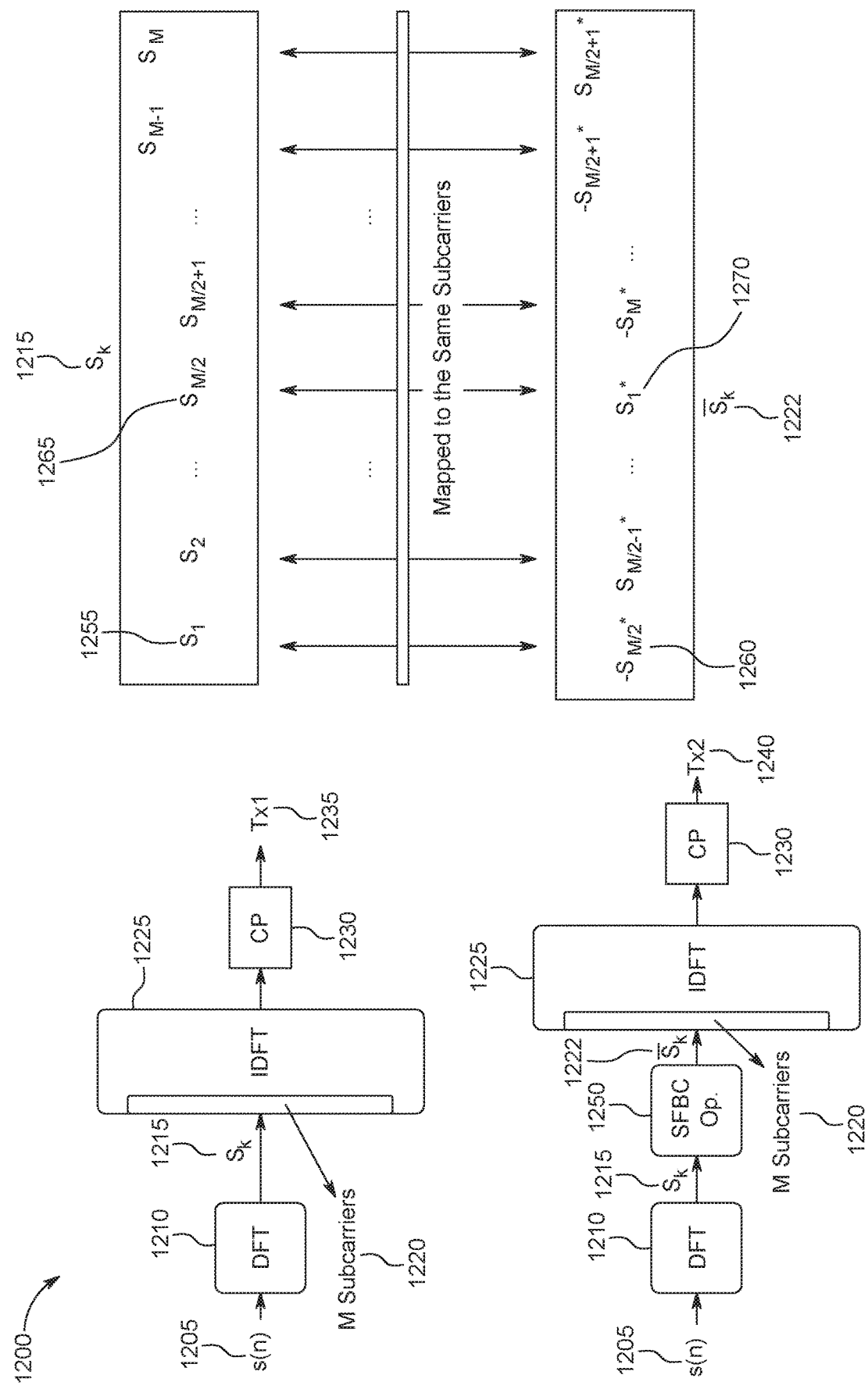
FIG. 12 is a diagram illustrating an example SFBC re-ordering via a circular rotation.

FIG. 12 illustrates an example SFBC re-ordering 1200 via a circular rotation, which may be used in combination with any of other embodiments described herein. As illustrated in FIG. 12, the SFBC re-ordering 1200 may be achieved via a circular rotation for a DFT size of M. For the first transmit antenna port TX1 1235, the data symbol input sequence s(n) 1205 (or data symbol input sequence segment) can be processed by a DFT block 1210, thereby resulting in a DFT precoded segment $S_k$ 1215. The DFT precoded segment $S_k$ 1215 can be mapped to M subcarriers 1220 at the IDFT block 1225. For the second antenna port TX2 1240, the output of the DFT block 1210 (i.e. $S_k$ 1215) may be subject to space frequency block (SFB) operations at the SFBC operation block 1250, thereby generating SFBC processed symbols $\bar{S}_k$ 1222. The SFB (or SFBC) operations may include, but are not limited to, circular rotation and conjugation. Some of the symbols in the DFT precoded segment $S_k$ 1215 may also be negated. Such operations may preserve the single carrier property, and may not result in an increase in the PAPR. The SFBC processed symbols $\bar{S}_k$ 1222 (or SFBC process segments) can be mapped to the same M subcarriers 1225 at the IDFT block 1225. In this example, SFBC may be applied to the pair of symbols $[S_i, S_j]$ on the first antenna port TX1 1235 and $[-S^*_j, S^*_i]$ on the second antenna port TX2 1240, where the symbols in a given pair may not be mapped to adjacent subcarriers. For example, in FIG. 12, $S_1$ 1255 is paried with $S_{M/2}$ 1265, but they are not mapped to adjacent subcarriers. The SFBC operation may be applied onto the paried symbols, $S_1$ 1255 and $S_{M/2}$ 1265, thereby generating SFBC processed symbols, $-S_{M/2}$ * 1260 and $S_1$ *1270. Similarly to the paired symbol $S_1$ 1255 and $S_{M/2}$ 1265, the symbol $-S_{M/2}$ * 1260 is paried with the symbol $S_1$ *1270, but they are not mapped to adjacent subcarriers. As illustrated in FIG. 12, $S_1$ 1255 and $-S_{M/2}$ * 1260 are mapped to the same subcarriers and $S_{M/2}$ 1265 and $S_1$ * are mapped to the same subcarriers. The IDFT block 1225 may be interchangeably referred to as an OFDM modulator.

It should be noted that the data symbol input sequence s(n) 1205 may be processed by a single DFT block 1215 or multiple DFT blocks. The output of the DFT block(s), $S_k$ 1215, may be processed by a single IDFT block 1225 or multiple IDFT blocks. The output of the DFT block(s), $S_k$ 1215, may be processed by a single SFBC operation block 1250 or multiple SFBC operation blocks. The SFBC processed segment $\bar{S}_k$ 1222 may be processed by a single IDFT block 1225 or multiple IDFT blocks.

Figure 13:
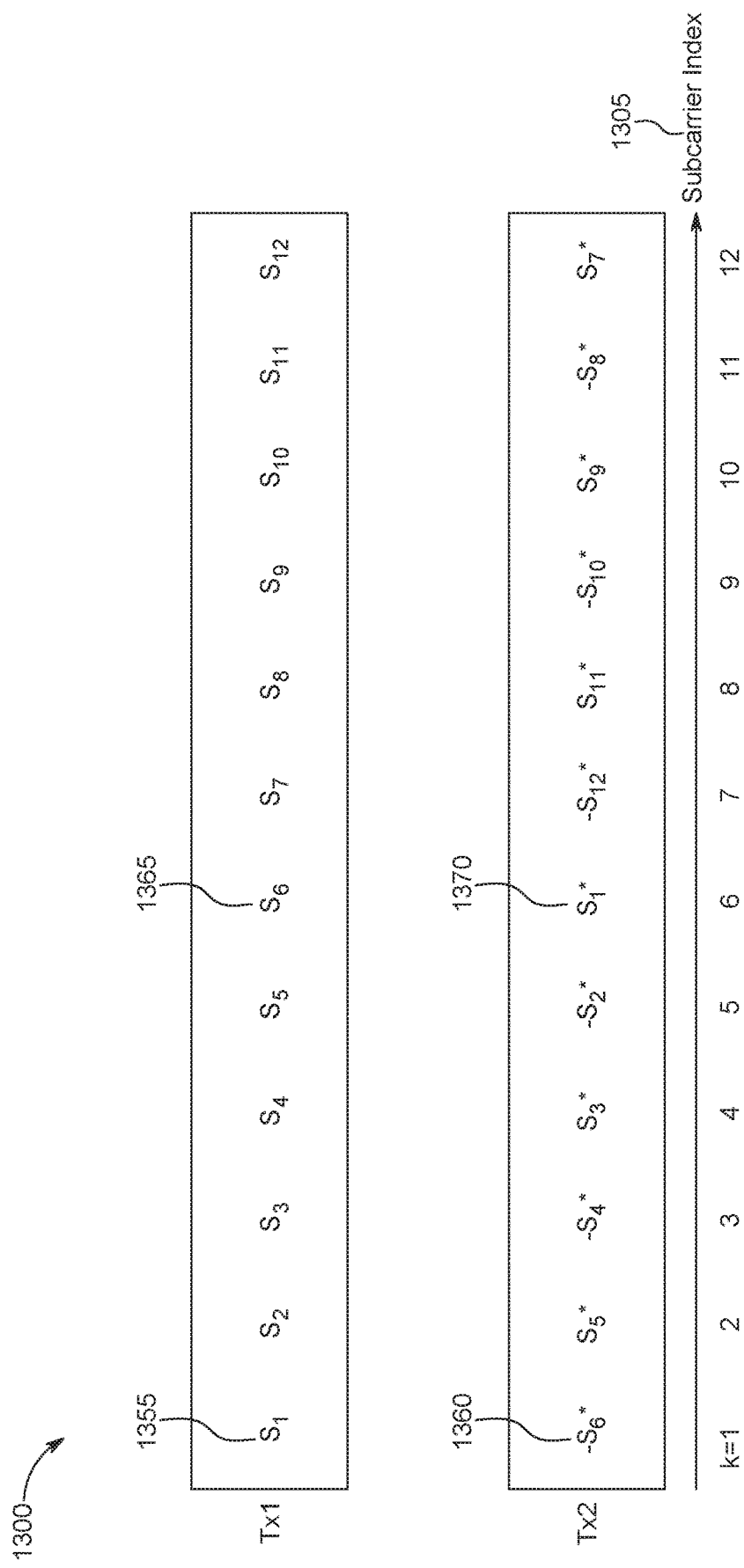
FIG. 13 is a diagram illustrating an example SFBC re-ordering where the number of subcarriers is 12 (M=12)

FIG. 13 illustrates an example SFBC re-ordering 1300 where the number of subcarriers is 12 (i.e. M=12). In this example, it is assumed that the subcarrier indices 1305 are 1, 2, . . . , M, where M is 12. As described above, SFBC operation may be applied over the symbols transmitted on subcarrier pairs given in Table 1. For example, SFBC operation is applied onto paired symbols, $S_1$ 1355 and $S_6$ 1365, thereby generating SFBC processed symbols, $-S_6$ * 1360 and $S_1$ *1370. The subcarriers used for SFBC for a given pair of symbols may be separated by one or more subcarriers. For example, as shown in Table 1, the distance (i.e. number of subcarriers) between the paired symbols, $S_1$ 1355 and $S_6$ 1365, is 5. As a result, the channel response experienced on the paired subcarriers may be significantly different. In general, if M subcarriers are used, then the largest separation between subcarrier pairs may be M/2−1. As the length of the sequence grows, the maximum distance in a given subcarrier pair used for SFBC may grow.

TABLE 1

Symbol pairs for SFBC

| Symbol pairs for SFBC | Distance (# of subcarriers) |
| --- | --- |
| (1, 6) | 5 |
| (2, 5) | 3 |
| (3, 4) | 1 |
| (7, 12) | 5 |
| (8, 11) | 3 |
| (9, 10) | 1 |

Figure 14:
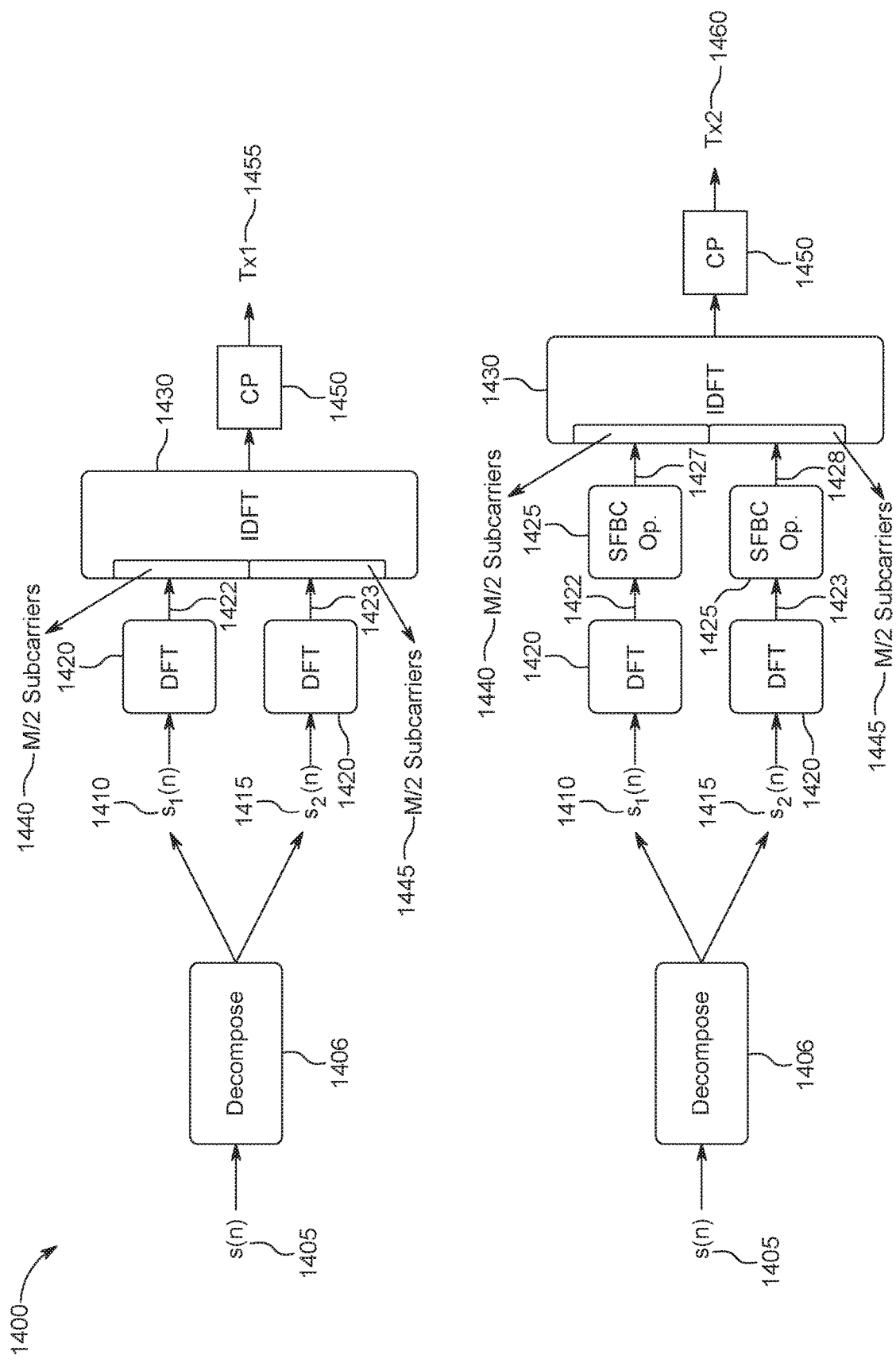
FIG. 14 is a diagram illustrating an example SFBC processing with one or more DFT blocks.

In an embodiment, the distance between the paired sub-carriers may be reduced by decomposing the input sequence into multiple blocks and applying a separate or a single DFT to each block. The output of the DFTs may be mapped to non-overlapping subcarriers at an IDFT block. FIG. 14 illustrates an example SFBC processing 1400 with one or more DFT blocks. In this example, for the first antenna port TX1 1455, the data symbol sequence (or data symbol sequence segment) $s(n)=[s_1(n)\ s_2(n)]$ 1405 can be decomposed (or divided) into two sub-sequences $s_1(n)$ 1410 and $s_2(n)$ 1415 at step 1406. Each sub-sequence $s_1(n)$ 1410 and $s_2(n)$ 1415 can be processed by one or more DFT blocks 1420 to generate DFT processed segments 1422, 1423. These DFT processed segments 1422, 1423 may then be mapped to half of the allocated subcarriers (M/2 subcarriers 1440, 1445) at the IDFT block 1430 for the first antenna port TX1 1455.

For the second antenna port TX2 1460, the DFT processed segments 1422, 1423 can be independently subject to the SFBC operations 1425 as explained above (e.g., circular rotation, conjugation and negation), before being mapped to the corresponding sets of subcarriers. After the SFBC operation 1425 being carried onto the DFT processed segments 1422, 1423, one or more SFBC processed segments 1427, 1428 may be generated. The one or more SFBC processed segments 1427, 1428 may then be mapped to half of the allocated subcarriers (M/2 subcarriers 1440, 1445) at the IDFT block 1430 for the second antenna port TX2 1460.

In general, the number of sub-sequences (e.g., $s_1(n)$ 1410 and $s_2(n)$ 1415) may be two or more and the sub-sequences may have the same or different sizes. The sub-sequences may also be mapped to subbands (where a subband is a set of contiguous subcarriers). The subbands can be adjacent or non-adjacent.

In an example, a data symbol input sequence (e.g., s(n) 1405) for a DFT-s-OFDM symbol (or OFDM symbol) may be split into one or more sub-sequences (or segments) (e.g., $s_1(n)$ 1410 and $s_2(n)$ 1415) for an SFBC encoding, wherein each sub-sequence (or segment) may be processed by one or more DFT and then mapped to half of the allocated subcarriers associated with the sub-sequence (or segment). As used herein, the terms sub-sequence and segment may be used interchangeably.

The data symbol input sequence may be unicast traffic and/or may include uplink control information. Each sub-sequence (or segment) split from the data symbol input sequence may be allocated (or transmitted) on a set of subcarriers. The set of subcarrier on which a sub-sequence (or segment) is allocated may be non-overlapped with a set of subcarriers on which another sub-carrier (or segment) is allocated. A set of subcarriers used or allocated for a segment may correspond to one or more physical resource blocks (PRBs). The one or more PRBs may correspond to the set of subcarriers and may be referred to as a segment PRB group (SPG).

In an example, a PRB may be formed with consecutive 12 subcarriers in frequency; one or more PRBs in an SPG may be consecutive in frequency (e.g., PRB indices are consecutive). In another example, a PRB may be formed with two subcarriers that are consecutive in frequency. The number of PRBs for an SPG may be predetermined. For example, a fixed number (e.g., 1 or 2) may be used. The number of PRBs for an SPG may be configured via a higher layer signaling. For example, a set of values may be predetermined and one of the set of values may be configured via a higher layer signaling. The number of PRBs for an SPG may be implicitly or explicitly indicated dynamically. For example, a set of values may be predetermined or configured (e.g., via higher layer signaling), and one of the set of values may be indicated dynamically.

The number of SPGs may be determined based on at least one of the number of PRBs allocated for a transmission (e.g., UL transmission), the number of PRBs for an SPG, or the like. For example, if the number of PRBs allocated for transmission is $N_b$ and the number of PRBs for an SPG is $N_s$, the number of SPGs for the transmission may be $\lceil N_b/N_s \rceil$, where [•] may be a ceiling operation. The number of SPGs may be indicated in an associated Downlink Control Information (DCI) and the number of PRBs for an SPG may be determined based on at least one of the number of SPGs indicated, the number of PRBs allocated for a transmission, or the like.

The number of PRBs for an SPG and/or the number of SPGs for a transmission may be determined based on one or more of scheduling parameters. The scheduling parameters may include, but are not limited to, at least one of modulation and coding scheme (MCS) level, uplink transmission power, the number of PRBs allocated for a UL transmission, the waveform used, the number of layers, and/or an initial transmission or retransmission. If the number of PRBs for an SPG and/or the number of SPGs for a transmission is determined based on modulation and coding scheme (MCS) level and if a MCS level is lower than a predefined threshold, a single SPG may be used and the number of PRBs for the SPG may be the same as the number of PRBs allocated for a transmission.

If the number of PRBs for an SPG and/or the number of SPGs for a transmission is determined based on uplink transmission power and if uplink transmission power is higher than a predefined threshold, a single SPG may be used. If the number of PRBs for an SPG and/or the number of SPGs for a transmission is determined based on the number of PRBs allocated for a UL transmission and if the number of PRBs for a UL transmission is smaller than a predefined threshold, a single SPG may be used. If the number of PRBs for an SPG and/or the number of SPGs for a transmission is determined based on waveform used; if a first waveform (e.g., OFDM) is used, a first number of PRBs for an SPG (e.g., 1); and if a second waveform (e.g., DFT-s-OFDM) is used, a second number of PRBs for an SPG (e.g., $N_b/2$). If the number of PRBs for an SPG and/or the number of SPGs for a transmission is determined based on number of layers and if the number of layer is lower than a predefined threshold, a single SPG may be used. If the number of PRBs for an SPG and/or the number of SPGs for a transmission is determined based on initial transmission or retransmission, for an initial transmission, a first number of PRBs for an SPG (e.g., 1) may be used and for a retransmission, a second number of PRBs for an SPG (e.g., $N_b/2$).

A WTRU may determine the number of PRBs for an SPG and/or the number of SPGs for an uplink transmission. For example, a WTRU may be scheduled for an uplink transmission with $N_b$ PRBs and the WTRU may determine the number of SPGs and the number of PRBs for an SPG based on the $N_b$ PRBs. The determined values for the number of PRBs for an SPG and/or the number of SPGs for an uplink transmission may be indicated based on at least one of uplink control information, demodulation reference signal sequence or the like.

Each segment (or sub-sequence) may be associated with uplink control information (UCI). For example, a first segment may be used for a first UCI (e.g., CQI) and a second segment may be used for a second UCI (e.g., precoding matrix indicator (PMI)). Each segment may be associated with a separate transport block. For example, a first segment may be used for a first transport block transmission and a second segment may be used for a second transport block transmission. Each segment may be scheduled with different scheduling parameters. For example, a first segment may be scheduled with a first MCS level and a second segment may be scheduled with a second MCS level.

Figure 15:
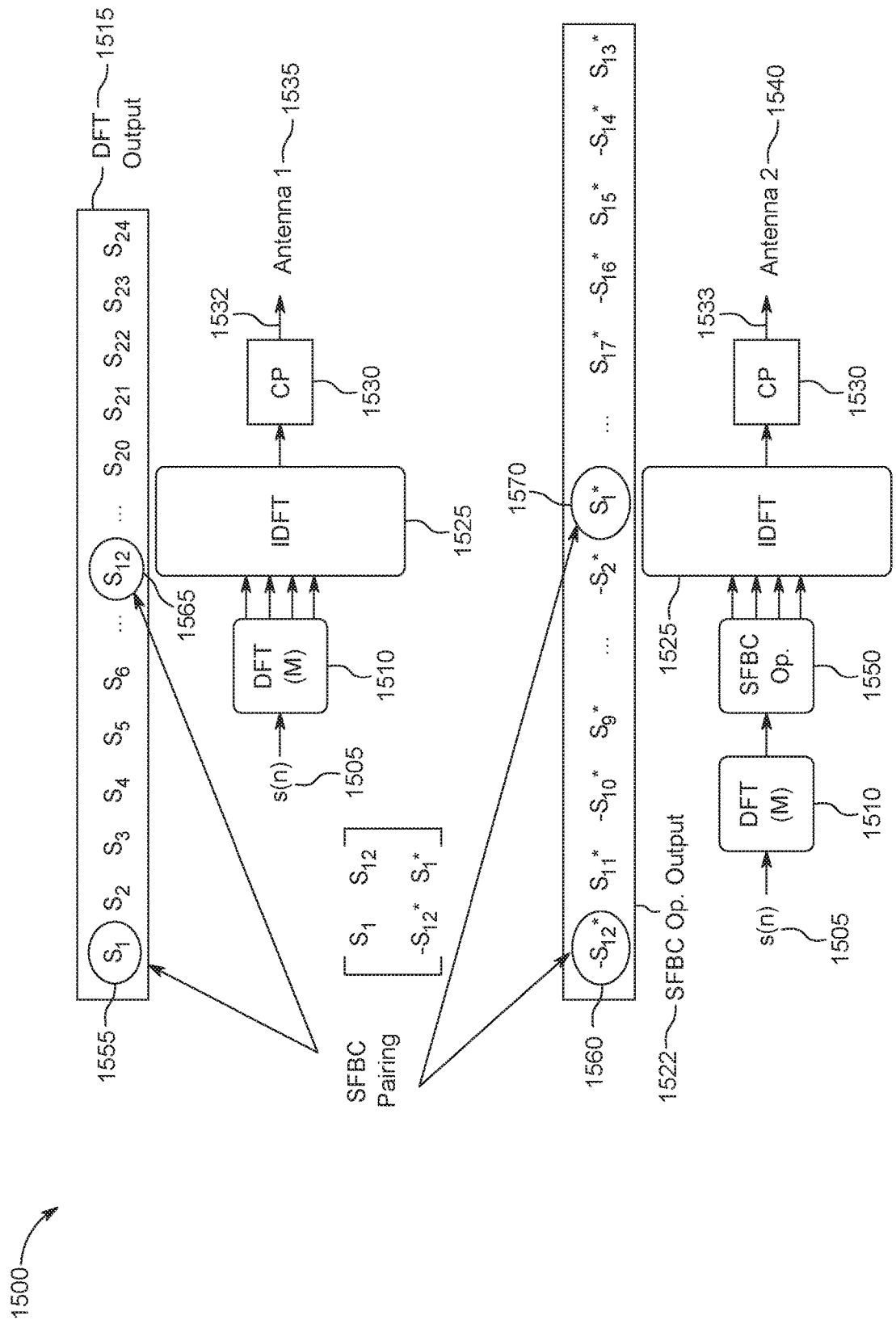
FIG. 15 is a diagram illustrating an example SFBC processing based on a single input sequence where the number of subcarriers is 24 (M=24)

FIG. 15 illustrates an example SFBC processing 1500 based on a single input sequence where the number of subcarriers is 24 (i.e. M=24). For the transmit antenna 1 1535, an input sequence (or input segment) s(n) 1505 may be processed by a DFT block 1510, thereby resulting in a DFT output 1515 (or DFT precoded segment). As illustrated in FIG. 15, the DFT output 1515 may include 24 data symbols ($S_1$, $S_2$, $S_3$, . . . , $S_{24}$) where the number of subcarrier is 24 (i.e. M=24). The DFT output 1515 (or DFT precoded segment) may be mapped to a set of contiguous subcarriers at the IDFT block 1525. The IDFT block 1525 may be interchangeably referred to as an OFDM modulator. After being mapped to the set of contiguous subcarriers, a first DFT-s-OFDM signal 1532 may be generated by adding the internal CPs 1530. The first DFT-s-OFDM signal 1532 may then be transmitted on the set of contiguous subcarriers via the transmit antenna 1 1535.

For the transmit antenna 2 1540, SFBC operation 1550 may be performed onto the DFT output 1515 to generate a SFBC operation output 1522 (or SFBC processed segment). Specifically, the SFBC operation output 1522 may be generated by reordering the data symbols in the DFT output 1515. Each of the data symbols in the DFT output 1515 may be reordered by circular rotation. The data symbols may also be conjugated and/or negated to generate the SFBC operation output 1522. For example, the SFBC operation 1550 may be applied onto the paired symbols of $S_1$ 1555 and $S_{12}$ 1565, thereby generating SFBC operation output symbols of $-S_{12}$* 1560 and $S_1$ *1570. As illustrated in FIG. 15, the SFBC operation output 1522 may include 24 data symbols ($-S_{12}$*, $S_{11}$*, $-S_{10}$*, . . . , $S_{13}$*) where the number of subcarrier is 24 (i.e. M=24). In this example, the maximum distance (i.e. maximum number of subcarriers) between paired symbols is 12 (i.e. M/2).

After the SFBC operation output 1522 is generated, the SFBC operation output 1522 (or SFBC processed segment) may be mapped to a set of contiguous subcarriers at the IDFT block 1525. After being mapped to the set of contiguous subcarriers, a second DFT-s-OFDM signal 1533 may be generated by adding the internal CPs 1530. The second DFT-s-OFDM signal 1533 may then be transmitted on the set of contiguous subcarriers via the transmit antenna 2 1540. It should be noted that the input sequence s(n) 1505 may be processed by a single DFT block 1515 or multiple DFT blocks. The DFT output 1515 may be processed by a single IDFT block 1525 or multiple IDFT blocks. The DFT output 1515 may be processed by a single SFBC operation block 1550 or multiple SFBC operation blocks. The SFBC operation output 1522 may be processed by a single IDFT block 1225 or multiple IDFT blocks.

Figure 16:
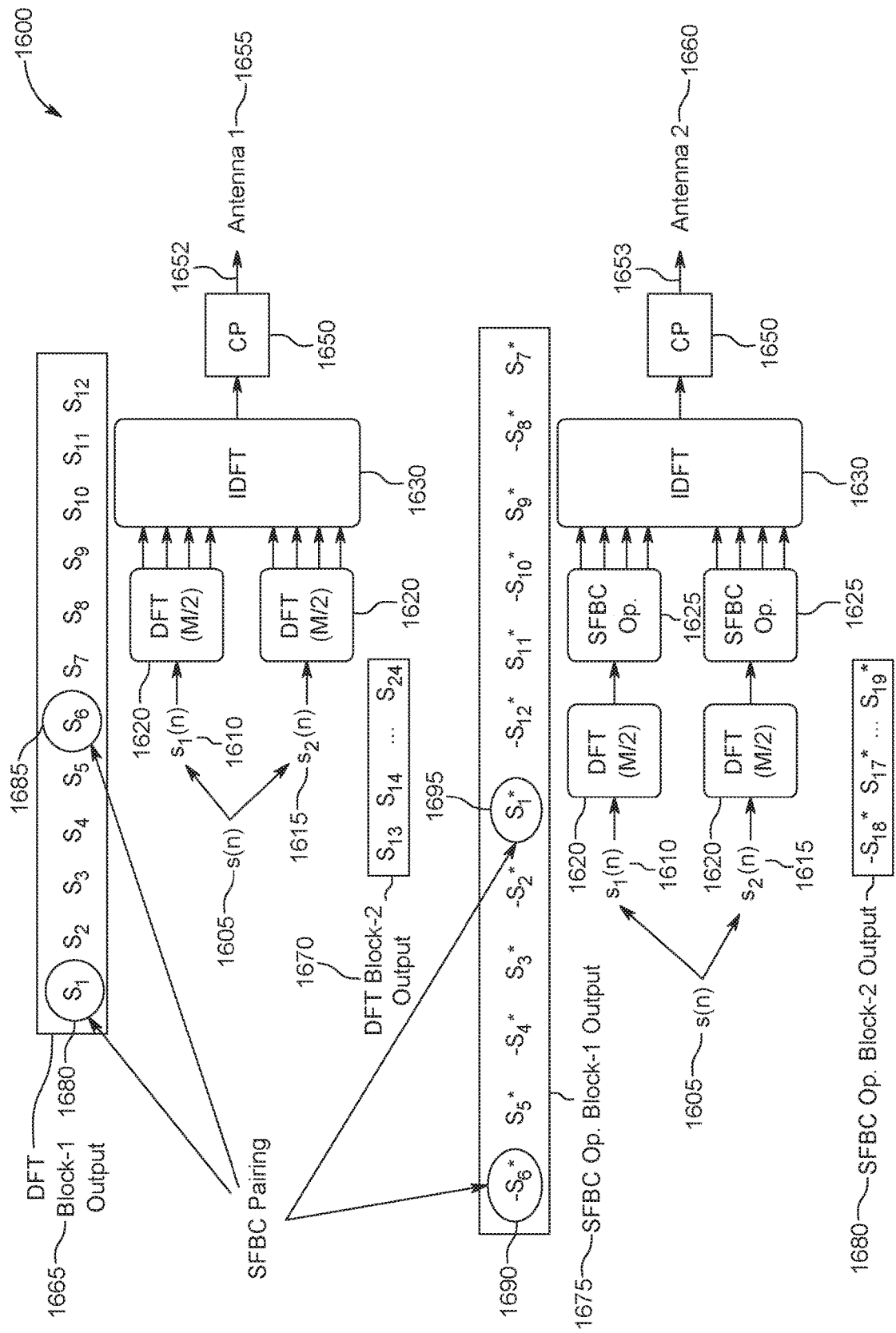
FIG. 16 is a diagram illustrating an example SFBC processing based on multiple input sequences where the number of subcarriers is 24 (M=24)

FIG. 16 illustrates an example SFBC processing 1600 based on multiple input sequences where the number of subcarriers is 24 (i.e. M=24). In this example, for the transmit antenna 1 1655, the input sequence (or input segment) s(n)=[$s_1$(n) $s_2$(n)] 1605 can be divided into two sub-sequences $s_1$(n) 1610 and $s_2$(n) 1615. Each sub-sequence $s_1$(n) 1610 and $s_2$(n) 1615 can be processed by one or more DFT blocks 1620 to generate DFT block-1 output 1665 and DFT block-2 output 1670. These DFT block outputs 1665, 1670 may then be mapped to sets of sub-subcarriers at the IDFT block 1630. After being mapped to the sets of contiguous subcarriers, a first DFT-s-OFDM signal 1652 may be generated by adding the internal CPs 1630. The first DFT-s-OFDM signal 1652 may then be transmitted on the sets of contiguous subcarriers via the transmit antenna 1 1635.

For the transmit antenna 2 1660, the DFT block outputs 1665, 1670 may then be independently subject to one or more SFBC operations 1625 as explained above (e.g., circular rotation, conjugation and negation), before being mapped to the same sets of subcarriers. After the one or more SFBC operation 1625 being carried onto the DFT block-1 output 1665 and DFT block-2 output 1670, SFBC operation block-1 output 1675 and SFBC operation block-2 output 1680 may be generated. These SFBC operation block outputs 1675, 1680 may then be mapped to sets of the allocated subcarriers at the IDFT block 1630 for the transmit antenna 2 1660. After being mapped to the sets of contiguous subcarriers, a second DFT-s-OFDM signal 1653 may be generated by adding the internal CPs 1630. The second DFT-s-OFDM signal 1653 may then be transmitted on the sets of contiguous subcarriers via the transmit antenna 2 1660.

Using multiple DFT blocks in a single DFT-s-OFDM symbol may result in a relative loss of the single carrier property. This in turn may result in an increase of cubic metric (CM) and Peak to Average Power Ratio (PAPR). In an embodiment, using a larger number of antennas at the WTRU side and applying group antenna-based DFT spreading and SF encoding may maintain the single carrier property of the signal while achieving transmit diversity. For example, in a WTRU with four transmit antennas, each sub-sequence $s_1$(n) or $s_2$(n) may be transmitted over a group of two antennas after DFT spreading and space frequency (SF) encoding. The DFT spreading and space frequency (SF) encoding can be done separately for each sub-sequence. In this example, for each antenna group, the WTRU may apply a DFT precoding to the sub-sequence, after mapping the original sequence with the SF encoded/reordered sequence to one half of the allocated subcarriers at the input of IDFT. The original sequence and the SF encoded/reordered sequence for each antenna group may be mapped to the same set of subcarriers at the input of IDFT of their respective antenna chain. The set of subcarriers used at the input of IDFTs for each antenna group may be non-overlapping.

Figure 17:
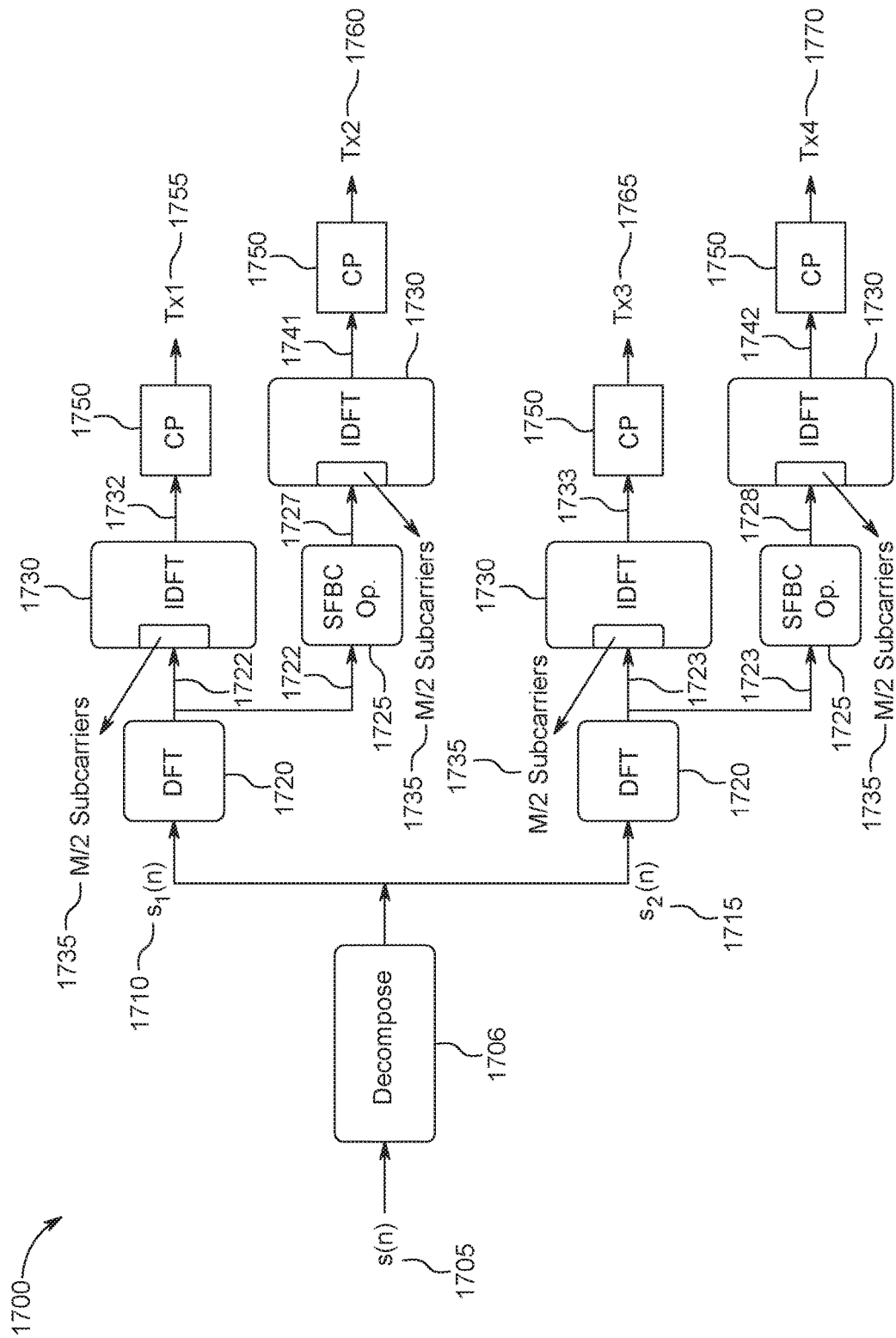
FIG. 17 is a diagram illustrating an example SFBC processing based on multiple DFT blocks for DFT-s-OFDM with group(s) of antennas.

FIG. 17 illustrates an example SFBC processing 1700 based on multiple DFT blocks for DFT-s-OFDM with group(s) of antennas. As illustrated in FIG. 17, transmit antennas TX1 1755 and TX2 1760 may be grouped together to form a first group. Similarly, transmit antennas TX3 1765 and TX4 1770 may be grouped together to form a second group. For the two groups of antennas (i.e. four transmit antennas 1755, 1760, 1765, 1770), an input sequence s(n) 1705 may be decomposed to two sub-sequences $s_1$(n) 1710 and s$_2$(n) 1715 at step 1706. Each of the two sub-sequences s$_1$(n) 1710 and s$_2$(n) 1715 may be transmitted over a group of two antennas after DFT spreading 1720 (or DFT precoding) and SF encoding (i.e. SFBC operation 1725). These DFT spreading 1720 and SFBC operation 1725 may be performed separately for each sub-sequence. For example, for the first antenna group of TX1 1755 and TX2 1760, the WTRU may apply a DFT spreading 1720 (or DFT precoding) to the sub-sequence s$_1$(n) 1710, thereby generating a DFT precoded segment 1722. The WTRU may then apply the SFBC operation 1725 onto the DFT precoded segments 1722, thereby generating a SFBC processed segment 1727 for the first antenna group 1755, 1760. For the second antenna group of TX3 1765 and TX4 1770, the WTRU may apply a DFT spreading 1720 (or DFT precoding) to the sub-sequence s$_2$(n) 1715, thereby generating a DFT precoded segment 1723. The WTRU may then apply the SFBC operation 1725 onto the DFT precoded segment 1723, thereby generating a SFBC processed segment 1728 for the second antenna group 1765, 1770.

For both antenna groups, the DFT precoded segments 1722, 1723 may be mapped to one half of allocated subcarriers (i.e. M/2 subcarriers 1735) at the IDFT block 1730. The SFBC processed segments 1727, 1728 may also be mapped to one half of allocated subcarriers (i.e. M/2 subcarriers 1735) at the IDFT block 1730. However, the sets of subcarriers used at the input of IDFT blocks 1730 may be non-overlapping. For example, the sets of subcarriers mapped to the DFT precoded segment 1722 and SFBC processed segment 1727 are non-overlapping. The outputs of IDFTs 1732, 1733 may be transmitted via the first and second antenna groups 1755, 1760, 1765, 1770 respectively after internal CPs 1750 are added onto the output of the IDFTs 1732, 1733.

The resource element mapping at the input of two IDFTs 1730 for TX1 1755 and TX2 1760 may be the same or similar. Similarly, the resource element mapping at the input of two IDFTs 1730 for TX3 1765 and TX4 1770 may be the same or similar. It should be noted that the number of antenna groups may be extended to a larger number. In this case, the WTRU may split the input sequence to multiple blocks, apply a separate DFT to each block, and map the output of the DFT and its SF encoded variant to non-overlapping subcarriers on the input of IDFTs for each antenna group as described above.

Figure 18:
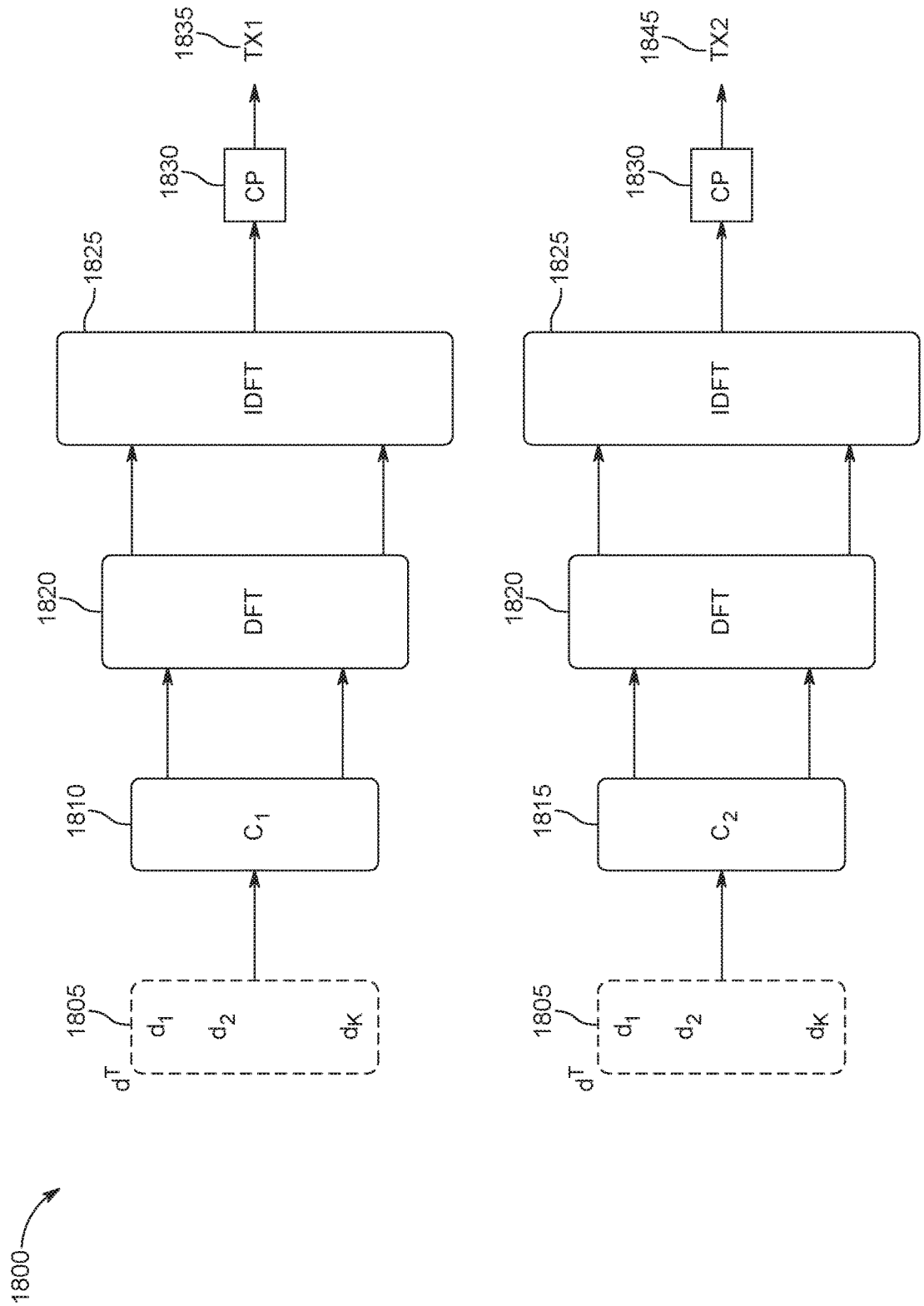
FIG. 18 is a diagram illustrating a code diversity scheme.

FIG. 18 is a diagram illustrating a code diversity scheme 1800 which may be used in combination with any of other embodiments described herein. An input data symbol, d$^T$ 1805, may be spread using a spreading sequence before being transmitted. d$^T$=[d$_1$ d$_2$ . . . d$_K$] 1805 may be a vector of modulation symbols, for example quadrature phase shift keying (QPSK) symbols, where the superscript T denotes transpose operation. C$_1$ 1810 may be a M×K matrix where each column of this matrix may comprise a predefined sequence and the columns may be orthogonal to each other. The output of C$_1$d may be mapped to certain inputs of a DFT 1820 as illustrated in FIG. 18. Alternatively or additionally, the output of C$_1$d may be directly mapped to a set of subcarriers (i.e. a set of inputs of the IDFT 1825).

For two transmit antenna ports TX1 1835 and TX2 1845, a code diversity may be achieved using orthogonal spreading sequences as illustrated in FIG. 18. In this example, the data symbol may be spread using different spreading matrices. The data symbols transmitted from antenna port i may be spread with C$_i$ while the data symbols from antenna port j may be spread with C$_j$, where C$_j$C$_j^H$=I, i≠j, the superscript H denotes the Hermitian operation, and the letter I denotes the identity matrix. For example, the data symbol transmitted from TX1 1835 may be spread with C$_1$ 1810 and the data symbol transmitted from TX2 1845 may be spread with C$_2$1815. The spreading matrices may also be arranged such that their columns are not be orthogonal to each other, but may satisfy other criteria. For example, the spreading matrices may have low cross correlation (e.g., cross correlation below a desired threshold). An output of the DFT blocks 1820 for the different antenna ports may be mapped to the same subbands, may be mapped to subbands that may partially overlap (e.g., subbands that contain at least one common subcarrier), or may be mapped to non-overlapping subbands.

In an embodiment, if a PUCCH transmission includes multiple DFT-s-OFDM symbols, a different cover code may be applied to the set of DFT-s-OFDM symbols from each antenna port. As an example, for two DFT-s-OFDM symbols, the symbols from the first antenna port may be multiplied by [1 1], while the symbols from the second antenna port may be multiplied by [1 −1].

A central controller may configure the set of subcarriers used for transmission in each antenna port, the set of spreading sequences and cover codes, the size of the DFT blocks, or the like, among other parameters. Some or all of these parameters may also be dynamically signaled to the transmitting terminal.

Figure 19:
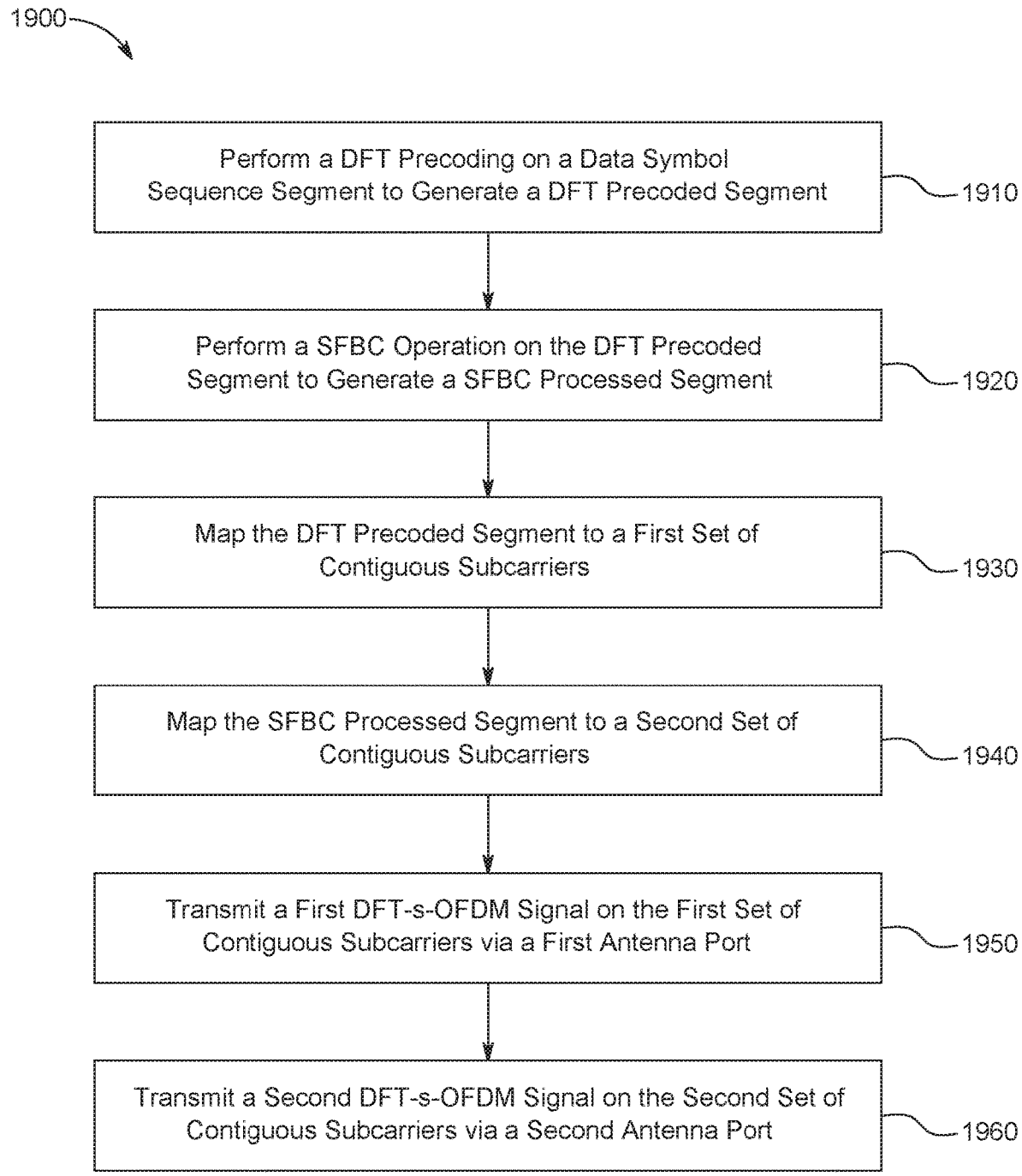
FIG. 19 is a diagram illustrating an example transmit diversity procedure for uplink control channel using DFT-s-OFDM.

FIG. 19 illustrates an example transmit diversity procedure 1900 for uplink control channel using DFT-s-OFDM. For example, at step 1910, a WTRU may perform a DFT precoding operation on a data symbol sequence segment (or input sequence) to generate a DFT precoded segment. The data symbol sequence segment (or input sequence) may include uplink control information or the like. The DFT precoded segment may include M number of data symbols where the M denotes the number of subcarriers. At step 1920, the WTRU may perform a SFBC operation on the DFT precoded segment to generate a SFBC processed segment. The SFBC operation may include at least one of a circular rotation operation, a conjugation operation, or a negation operation on the DFT precoded segment. For example, the data symbols in the DFT precoded segment may be reordered by circular rotation. The reordered data symbols may be conjugated and/or negated to generate the SFBC processed segment. Each of the data symbols in the DFT precoded segment may be paired with each of data symbols in the SFBC processed segment. The maximum distance of the paired data symbols in the DFT precoded segment and SFBC processed segment may be a number of subcarriers divided by two (2).

In an embodiment, the data symbol sequence segment (or input sequence) may be split into multiple data symbol sequence segments before the DFT precoding operation being performed. In this case, the WTRU may perform one or more DFT precoding operation on the multiple data symbol sequence segments, thereby generating multiple DFT precoded segments. The WTRU may then perform one or more SFBC operations on the multiple DFT precoded segments, thereby generating multiple SFBC processed segments.

When a data symbol sequence segment (or input sequence) is divided into multiple data symbol sequence segments, each of the data symbols in DFT precoded segments may be paired with each of respective data symbols in SFBC processed segments. The maximum distance of the paired data symbols may be a number of subcarriers divided by two (2). For example, when a single data symbol sequence segment is used where the number of subcarriers is 24, the maximum distance between paired subcarriers is 12. However, when multiple data symbol sequence segments are used where the number of subcarriers is 24, the maximum distance between paired subcarriers is 6. Because the maximum distance between the paired subcarriers is decreased with multiple segmenting on the data symbol sequence (or input sequence), the channel variance between the separated subcarriers may be reduced.

The number of the data symbol sequence segment may be determined based on at least one of a channel delay spread, a modulation order, a bandwidth (BW) allocation, or the like (e.g., more blocks or segments for larger delay spread, larger BW, and/or higher modulation order).

Upon generating the DFT precoded segment, at step 1930, the WTRU may map the DFT precoded segment to a first set of contiguous subcarriers of a first OFDM modulator. Upon generating the SFBC processed segment, at step 1940, the WTRU may map the SFBC processed segment to a second set of contiguous subcarriers of a second OFDM modulator. The first set of contiguous subcarriers and the second set of contiguous subcarriers may not be adjacent or overlapping. At step 1950, the WTRU may transmit the output of the first OFDM modulator (i.e. a first DFT-s-OFDM signal) on the first set of contiguous subcarriers via a first antenna port. At step 1960, the WTRU may also transmit the output of the second OFDM modulator (i.e. a second DFT-s-OFDM signal) on the second set of contiguous subcarriers via a second antenna port.

It should be noted that at least one processor in association with software or instructions may be used to implement/execute the embodiments described herein. The at least one processor may be electronic circuits which performs operations on memory or some other data stream. The at least one processor may include a central processing unit (CPU), a microprocessor, a signal processor, network processor, a serial-to-parallel converter, a Discrete Fourier Transform (DFT) processor, a subcarrier mapper, an inverse DFT (IDFT) processor, a DFT block, an IDFT block, modulator, a cyclic prefix (CP) adder, a parallel-to-serial converter, a digital-to-analog converter, or the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU), the method comprising:
    splitting a data symbol input sequence into multiple data symbol sequence segments, wherein a number of the multiple data symbol sequence segments is determined based on a channel delay spread, a modulation order, and a bandwidth allocation;
    performing a first Discrete Fourier Transform (DFT) precoding operation on a first data symbol sequence segment from the multiple data symbol sequence segments to generate a first DFT precoded segment;
    performing a first Space Frequency Block Coding (SFBC) operation on the first DFT precoded segment to generate a first SFBC processed segment, wherein data symbols of the first DFT precoded segment are reordered in the first SFBC processed segment; and
    transmitting a first Discrete Fourier Transform spread Orthogonal Frequency Division Multiplexing (DFT-s-OFDM) signal on a first set of contiguous subcarriers determined based on the first DFT precoded segment via a first antenna port and a second DFT-s-OFDM signal on a second set of contiguous subcarriers determined based on the first SFBC processed segment via a second antenna port.

2. The method of claim 1, further comprising:
    performing a second DFT precoding operation on a second data symbol sequence segment from the multiple data symbol sequence segments to generate a second DFT precoded segment;
    performing a second SFBC operation on the second DFT precoded segment to generate a second SFBC processed segment, wherein data symbols of the second DFT precoded segment are reordered in the second SFBC processed segment; and
    transmitting a third DFT-s-OFDM signal on a third set of contiguous subcarriers determined based on the second DFT precoded segment via the first antenna port and a fourth DFT-s-OFDM signal on a fourth set of contiguous subcarriers determined based on the second SFBC processed segment via the second antenna port.

3. The method of claim 2, wherein the first set of contiguous subcarriers determined based on the second DFT precoded segment and the third set of contiguous subcarriers determined based on the second DFT precoded segment are not adjacent.

4. The method of claim 2, wherein the second set of contiguous subcarriers and the fourth set of contiguous subcarriers are not adjacent.

5. The method of claim 1, wherein each of the data symbols of the first DFT precoded segment are paired with each of data symbols of the first SFBC processed segment.

6. The method of claim 5, wherein a maximum distance of the paired data symbols between the first DFT precoded segment and the first SFBC processed segment is a number of subcarriers divided by two (2).

7. The method of claim 1, wherein the multiple data symbol sequence segments include one or more uplink control information.

8. The method of claim 1, wherein the first SFBC operation includes at least one of a circular rotation operation, a conjugation operation, or a negation operation.

9. A wireless transmit/receive unit (WTRU) comprising:
    at least one processor configured to:
    split a data symbol input sequence into multiple data symbol sequence segments, wherein a number of the multiple data symbol sequence segments is determined based on at least one of a channel delay spread, a modulation order, and a bandwidth allocation;
    perform a first Discrete Fourier Transform (DFT) precoding operation on a first data symbol sequence segment from the multiple data symbol sequence segments to generate a first DFT precoded segment; and perform a first Space Frequency Block Coding (SFBC) operation on the first DFT precoded segment to generate a first SFBC processed segment, wherein data symbols of the first DFT precoded segment are reordered in the first SFBC processed segment; and at least one transmitter configured to transmit a first Discrete Fourier Transform spread Orthogonal Frequency Division Multiplexing (DFT-s-OFDM) signal on a first set of contiguous subcarriers determined based on the first DFT precoded segment and a second DFT-s-OFDM signal on a second set of contiguous subcarriers determined based on the first SFBC processed segment.

10. The WTRU of claim 9, wherein the at least one processor is further configured to:

perform a second DFT precoding operation on a second data symbol sequence segment from the multiple data symbol sequence segments to generate a second DFT precoded segment; and perform a second SFBC operation on the second DFT precoded segment to generate a second SFBC processed segment, wherein data symbols of the second DFT precoded segment is reordered in the second SFBC processed segment, and wherein the at least one transmitter is further configured to transmit a third DFT-s-OFDM signal on a third set of contiguous subcarriers determined based on the second DFT precoded segment, and a fourth DFT-s-OFDM signal on a fourth set of contiguous subcarriers determined based on the second SFBC processed segment.

11. The WTRU of claim 10, wherein the first set of contiguous subcarriers and the third set of contiguous subcarriers are not adjacent.

12. The WTRU of claim 10, wherein the second set of contiguous subcarriers and the fourth set of contiguous subcarriers are not adjacent.

13. The WTRU of claim 9, wherein each of the data symbols of the first DFT precoded segment are paired with each of data symbols of the first SFBC processed segment.

14. The WTRU of claim 9, wherein the multiple data symbol sequence segments include one or more uplink control information.

15. The WTRU of claim 9, wherein the first SFBC operation includes at least one of a circular rotation operation, a conjugation operation, or a negation operation.

16. A base station (BS) comprising: at least one processor configured to:

split a data symbol input sequence into multiple data symbol sequence segments, wherein a number of the multiple data symbol sequence segments is determined based on a channel delay spread, a modulation order, and a bandwidth allocation;

perform a first Discrete Fourier Transform (DFT) precoding operation on a first data symbol sequence segment from the multiple data symbol sequence segments to generate a first DFT precoded segment; and perform a first Space Frequency Block Coding (SFBC) operation on the first DFT precoded segment to generate a first SFBC processed segment, wherein data symbols of the first DFT precoded segment are reordered in the first SFBC processed segment; and at least one transmitter configured to transmit a first Discrete Fourier Transform spread Orthogonal Frequency Division Multiplexing (DFT-s-OFDM) signal on a first set of contiguous subcarriers determined based on the first DFT precoded segment and a second DFT-s-OFDM signal on a second set of contiguous subcarriers determined based on the first SFBC processed segment.

17. The BS of claim 16, wherein the at least one processor is further configured to:

perform a second DFT precoding operation on a second data symbol sequence segment from the multiple data symbol sequence segments to generate a second DFT precoded segment; and perform a second SFBC operation on the second DFT precoded segment to generate a second SFBC processed segment, wherein data symbols of the second DFT precoded segment is reordered in the second SFBC processed segment, and wherein the at least one transmitter is further configured to transmit a third DFT-s-OFDM signal on a third set of contiguous subcarriers determined based on the second DFT precoded segment, and a fourth DFT-s-OFDM signal on a fourth set of contiguous subcarriers determined based on the second SFBC processed segment.

* * * * *